(12) United States Patent
Curry et al.

(10) Patent No.: US 12,043,282 B1
(45) Date of Patent: Jul. 23, 2024

(54) AUTONOMOUS VEHICLE STEERABLE SENSOR MANAGEMENT

(71) Applicant: Aurora Operations, Inc., Mountain View, CA (US)

(72) Inventors: James Robert Curry, Bozeman, MT (US); Fangrong Peng, Sunnyvale, CA (US)

(73) Assignee: Aurora Operations, Inc., Pittsburgh, PA (US)

( * ) Notice: Subject to any disclaimer, the term of this patent is extended or adjusted under 35 U.S.C. 154(b) by 0 days.

(21) Appl. No.: 18/158,854

(22) Filed: Jan. 24, 2023

Related U.S. Application Data

(60) Provisional application No. 63/478,001, filed on Dec. 30, 2022.

(51) Int. Cl.
*B60W 60/00* (2020.01)
*G01S 17/89* (2020.01)
*G01S 17/931* (2020.01)

(52) U.S. Cl.
CPC .......... *B60W 60/001* (2020.02); *G01S 17/89* (2013.01); *G01S 17/931* (2020.01); *B60W 2556/40* (2020.02)

(58) Field of Classification Search
CPC . B60W 60/001; B60W 2556/40; G01S 17/89; G01S 17/931
See application file for complete search history.

(56) References Cited

U.S. PATENT DOCUMENTS

| 2016/0018822 A1* | 1/2016 | Nevdahs | G05D 1/0094 |
| | | | 701/26 |
| 2018/0021954 A1* | 1/2018 | Fischer | B25J 19/02 |
| | | | 700/253 |
| 2019/0092287 A1* | 3/2019 | Leach | B60S 1/56 |
| 2020/0379456 A1* | 12/2020 | Ko | G01S 17/86 |

* cited by examiner

*Primary Examiner* — Ig T An
(74) *Attorney, Agent, or Firm* — Schwegman Lundberg & Woessner, P.A.

(57) ABSTRACT

Various examples are directed to systems and methods for directing a field-of-view of a first sensor positioned on an autonomous vehicle. In one example, at least one processor selects a goal location on at least one travel way in an environment of the autonomous vehicle. The selecting of the goal location is based at least in part on map data describing at least one travel way in an environment of the autonomous vehicle and pose data describing a position of the autonomous vehicle in the environment. The at least one processor determines a field-of-view position to direct the first sensor towards the goal location based at least in part on the sensor position data. The at least one processor sends a field-of-view command to the first sensor. The field-of-view command modifies the field-of-view of the first sensor based on the field-of-view position.

21 Claims, 19 Drawing Sheets

US 12,043,282 B1

AUTONOMOUS VEHICLE STEERABLE SENSOR MANAGEMENT

CLAIM FOR PRIORITY

This application claims the benefit of priority of U.S. Application Ser. No. 63/478,001, filed Dec. 30, 2022, which is hereby incorporated by reference in its entirety.

BACKGROUND

The automobile industry is currently developing autonomous features for controlling vehicles under certain circumstances. According to Society of Automotive Engineers (SAE) International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment.

DRAWINGS

SUMMARY

Figure 1:
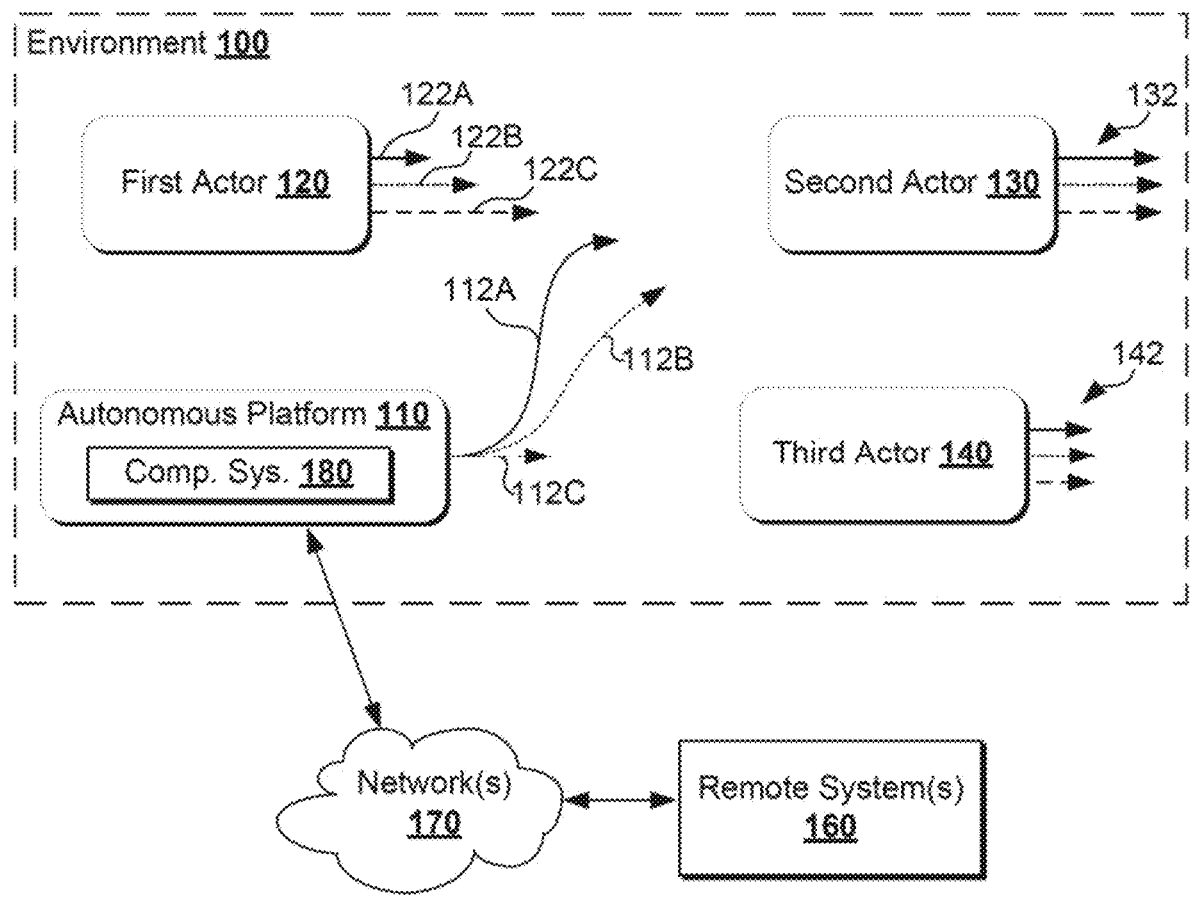
FIG. 1 is a block diagram of an example operational scenario, according to some implementations of the present disclosure.

An autonomous vehicle may comprise one or more steerable sensors having steerable fields-of-view. When an autonomous vehicle comprises one or more steerable sensors, it is desirable to advantageously manage the field of view-eight field-of-view.

Various examples described herein are directed to systems and methods for managing steerable sensors in an autonomous vehicle. For example, the autonomous vehicle (e.g., an autonomy system thereof) may determine a goal location in an environment of the autonomous vehicle and instruct the steerable sensor to steer its field-of-view based on the goal location.

In some implementations, a system is provided for directing a field-of-view of a first sensor positioned on an autonomous vehicle. The system may comprise at least one processor that is programmed to perform operations. The operations may comprise accessing map data describing at least one travel way in an environment of the autonomous vehicle and accessing pose data describing a position of the autonomous vehicle in the environment of the autonomous vehicle. The operations may also comprise accessing sensor position data describing a position of the first sensor. The operations may further comprise selecting a goal location on the at least one travel way, where the selecting of the goal location is based at least in part on the map data and the pose data. The operations may also comprise determining a field-of-view position to direct the first sensor towards the goal location based at least in part on the sensor position data and sending a field-of-view command to the first sensor to modify the field-of-view of the first sensor based on the field-of-view position.

These and other implementations of the instant disclosure may include one or more of the following features.

In some implementations, the selecting of the goal location comprises selecting, from a plurality of positions on the at least one travel way, a candidate location that meets a plurality of goal conditions. The plurality of goal conditions comprising a condition that the candidate location be within a range of distances from the position of the autonomous vehicle.

In some implementations, the plurality of goal conditions further comprises a condition that the candidate location be within an azimuth range of a direction of the autonomous vehicle indicated by the pose data.

In some implementations, the plurality of goal conditions further comprises a condition that the candidate location be within a field-of-regard of the first sensor.

In some implementations, the plurality of goal conditions further comprises a condition that a line-of-sight from the position of the first sensor to the goal location is not occluded by any map objects described by the map data.

In some implementations, the plurality of goal conditions further comprises a condition that the candidate location is on a travel way at a common travel way level with a current travel way of the autonomous vehicle based at least in part on the position of the autonomous vehicle.

In some implementations, the operations further comprise receiving route data describing a route of the autonomous vehicle, and the plurality of goal conditions further comprise a condition that the candidate location be on the route of the autonomous vehicle.

In some implementations, the operations further comprise receiving route data describing a route of the autonomous vehicle, and the plurality of goal conditions further comprise a condition that the candidate location be either on the route of the autonomous vehicle or on a travel way that leads to the route of the autonomous vehicle.

In some implementations, the plurality of goal conditions further comprises a condition that a difference between a direction of travel associated with the autonomous vehicle and a direction of travel at a portion of a travel way comprising the goal location be less than a threshold.

In some implementations, the determining of the field-of-view position to direct the first sensor towards the goal location comprises using the map data and the pose data; determining a line from the position of the autonomous vehicle to the goal location; using the sensor position data, translating the line to generate a translated line from the position of the first sensor to the goal location; and determining an angle between the translated line and a direction of the first sensor, the field-of-view position being based at least in part on the angle between the translated line and the direction of the sensor.

In some implementations, the map data, the pose data, and the sensor position data are independent of first sensor data generated by the first sensor.

In some implementations, the operations further comprise receiving second sensor data generated by a second sensor different than the first sensor, the second sensor data describing at least a portion of the environment of the autonomous vehicle in a three-dimensional space; determining a second goal location; applying an image processing algorithm to a portion of the second sensor data representing an area around the second goal location in the three-dimensional space to generate processed second sensor data; and controlling the autonomous vehicle based at least in part on the processed second sensor data.

In some implementations, a method is provided that comprises accessing map data describing at least one travel way in an environment of the autonomous vehicle; accessing pose data describing a position of the autonomous vehicle in the environment of the autonomous vehicle; accessing sensor position data describing a position of the first sensor; selecting a goal location on the at least one travel way, the selecting of the goal location being based at least in part on the map data and the pose data; determining, a field-of-view position to direct the first sensor towards the goal location, the determining of the field-of-view position being based at least in part on the sensor position data; and sending a field-of-view command to the first sensor, the field-of-view command to modify the field-of-view of the first sensor based on the field-of-view position.

These and other implementations of the instant disclosure may include one or more of the following features.

In some implementations, the selecting of the goal location comprises selecting, from a plurality of positions on the at least one travel way, a candidate location that meets a plurality of goal conditions. The plurality of goal conditions comprising a condition that the candidate location be within a range of distances from the position of the autonomous vehicle.

In some implementations, the plurality of goal conditions further comprises a condition that the candidate location be within an azimuth range of a direction of the autonomous vehicle indicated by the pose data.

In some implementations, the plurality of goal conditions further comprises a condition that the candidate location be within a field-of-regard of the first sensor.

In some implementations, the plurality of goal conditions further comprises a condition that a line-of-sight from the position of the first sensor to the goal location is not occluded by any map objects described by the map data.

In some implementations, the plurality of goal conditions further comprises a condition that the candidate location is on a travel way at a common travel way level with a current travel way of the autonomous vehicle based at least in part on the position of the autonomous vehicle.

In some implementations, the operations further comprise receiving route data describing a route of the autonomous vehicle, and the plurality of goal conditions further comprise a condition that the candidate location be on the route of the autonomous vehicle.

In some implementations, the operations further comprise receiving route data describing a route of the autonomous vehicle, and the plurality of goal conditions further comprise a condition that the candidate location be either on the route of the autonomous vehicle or on a travel way that leads to the route of the autonomous vehicle.

In some implementations, the plurality of goal conditions further comprises a condition that a difference between a direction of travel associated with the autonomous vehicle and a direction of travel at a portion of a travel way comprising the goal location be less than a threshold.

In some implementations, the determining of the field-of-view position to direct the first sensor towards the goal location comprises using the map data and the pose data; determining a line from the position of the autonomous vehicle to the goal location; using the sensor position data, translating the line to generate a translated line from the position of the first sensor to the goal location; and determining an angle between the translated line and a direction of the first sensor, the field-of-view position being based at least in part on the angle between the translated line and the direction of the sensor.

In some implementations, the map data, the pose data, and the sensor position data are independent of first sensor data generated by the first sensor.

In some implementations, the operations further comprise receiving second sensor data generated by a second sensor different than the first sensor, the second sensor data describing at least a portion of the environment of the autonomous vehicle in a three-dimensional space; determining a second goal location; applying an image processing algorithm to a portion of the second sensor data representing an area around the second goal location in the three-dimensional space to generate processed second sensor data; and controlling the autonomous vehicle based at least in part on the processed second sensor data.

In some examples, a non-transitory computer-readable storage medium is provided comprising instructions thereon that, when executed by one or more processors, cause the one or more processors to perform operations. The operations may comprise accessing map data describing at least one travel way in an environment of the autonomous vehicle and accessing pose data describing a position of the autonomous vehicle in the environment of the autonomous vehicle. The operations may also comprise accessing sensor position data describing a position of the first sensor. The operations may further comprise selecting a goal location on the at least one travel way, where the selecting of the goal location is based at least in part on the map data and the pose data. The operations may also comprise determining a field-of-view position to direct the first sensor towards the goal location based at least in part on the sensor position data and sending a field-of-view command to the first sensor to modify the field-of-view of the first sensor based on the field-of-view position.

These and other implementations of the instant disclosure may include one or more of the following features.

In some implementations, the selecting of the goal location comprises selecting, from a plurality of positions on the at least one travel way, a candidate location that meets a plurality of goal conditions. The plurality of goal conditions comprising a condition that the candidate location be within a range of distances from the position of the autonomous vehicle.

In some implementations, the plurality of goal conditions further comprises a condition that the candidate location be within an azimuth range of a direction of the autonomous vehicle indicated by the pose data.

In some implementations, the plurality of goal conditions further comprises a condition that the candidate location be within a field-of-regard of the first sensor.

In some implementations, the plurality of goal conditions further comprises a condition that a line-of-sight from the position of the first sensor to the goal location is not occluded by any map objects described by the map data.

In some implementations, the plurality of goal conditions further comprises a condition that the candidate location is on a travel way at a common travel way level with a current travel way of the autonomous vehicle based at least in part on the position of the autonomous vehicle.

In some implementations, the operations further comprise receiving route data describing a route of the autonomous vehicle, and the plurality of goal conditions further comprise a condition that the candidate location be on the route of the autonomous vehicle.

In some implementations, the operations further comprise receiving route data describing a route of the autonomous vehicle, and the plurality of goal conditions further comprise a condition that the candidate location be either on the route of the autonomous vehicle or on a travel way that leads to the route of the autonomous vehicle.

In some implementations, the plurality of goal conditions further comprises a condition that a difference between a direction of travel associated with the autonomous vehicle and a direction of travel at a portion of a travel way comprising the goal location be less than a threshold.

In some implementations, the determining of the field-of-view position to direct the first sensor towards the goal location comprises using the map data and the pose data; determining a line from the position of the autonomous vehicle to the goal location; using the sensor position data, translating the line to generate a translated line from the position of the first sensor to the goal location; and determining an angle between the translated line and a direction of the first sensor, the field-of-view position being based at least in part on the angle between the translated line and the direction of the sensor.

In some implementations, the map data, the pose data, and the sensor position data are independent of first sensor data generated by the first sensor.

In some implementations, the operations further comprise receiving second sensor data generated by a second sensor different than the first sensor, the second sensor data describing at least a portion of the environment of the autonomous vehicle in a three-dimensional space; determining a second goal location; applying an image processing algorithm to a portion of the second sensor data representing an area around the second goal location in the three-dimensional space to generate processed second sensor data; and controlling the autonomous vehicle based at least in part on the processed second sensor data.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

With reference to FIGS. 1-15, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicle may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally, or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
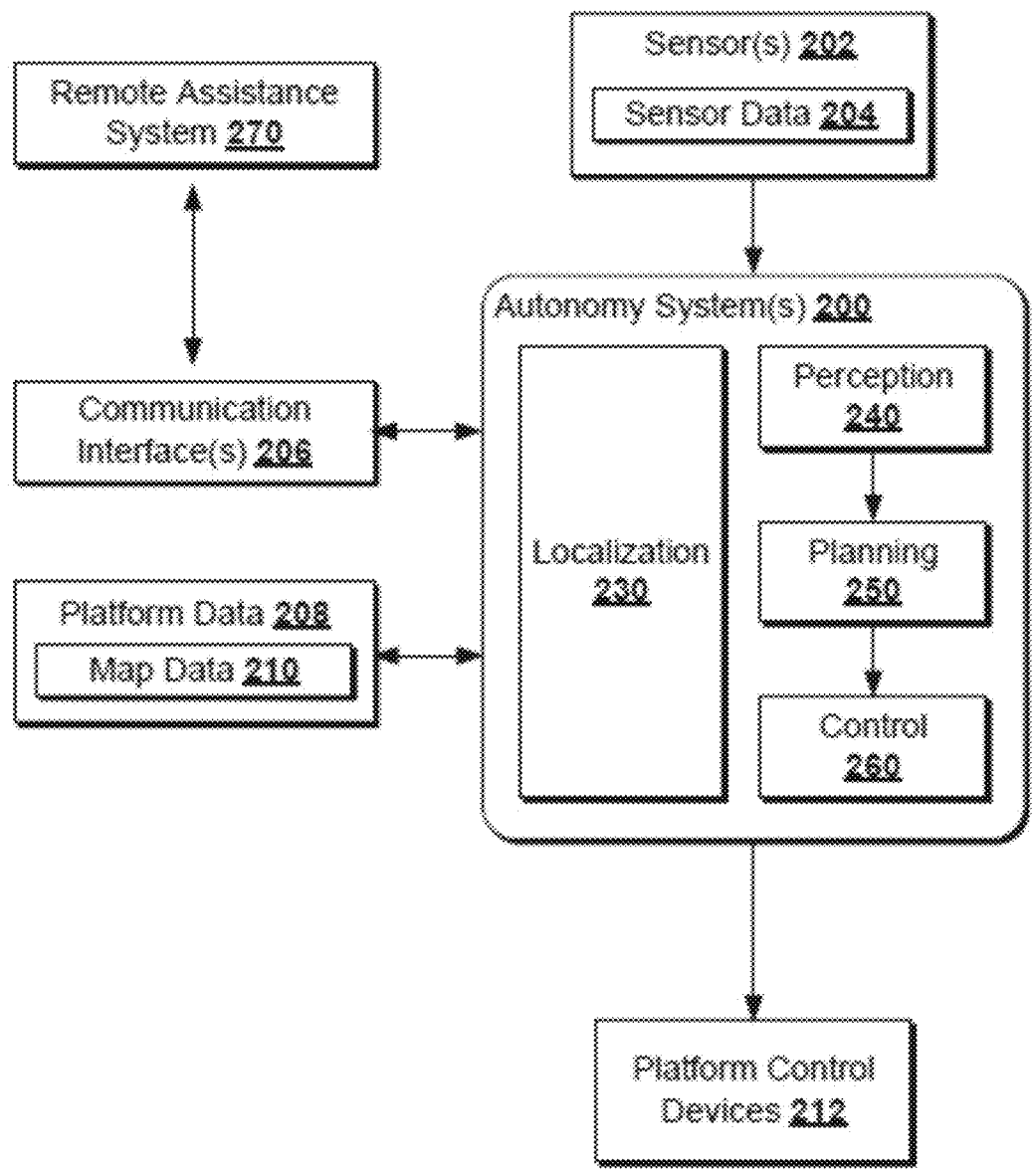
FIG. 2 is a block diagram of an example autonomy system for an autonomous platform, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc., by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally, or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include, for example, sensor data 204 captured by a different autonomous platform.

Some or all of the sensors 202 can have a sensing cycle. For example, a LIDAR sensor or sensors can scan a certain area during a particular sensing cycle to detect an object or an environment in the area. In some versions of those implementations, a given instance of the LIDAR data can include the LIDAR data from a given sensing cycle of a LIDAR sensor or sensors. For example, a given LIDAR data instance may correspond to a given sweep of the LIDAR sensor or sensors generated during the sensing cycle of the LIDAR sensor or sensors.

The LIDAR data generated during the sensing cycle of a LIDAR sensor or sensors can include, for example, a plurality of points reflected off of a surface of an object in an environment of the autonomous platform, and detected by at least one receiver component of the LIDAR sensor or sensors as data points. During a given sensing cycle, the LIDAR sensor or sensors can detect a plurality of data points in an area of the environment of the autonomous platform. One or more of the data points may also be captured in subsequent sensing cycles. Accordingly, the range and velocity for a point that is indicated by the LIDAR data sweep of the LIDAR sensor or sensors can be based on multiple sensing cycle events by referencing prior (and optionally subsequent) sensing cycle events. In some versions of those implementations, multiple (e.g., all) sensing cycles can have the same duration, the same field-of-view, and/or the same pattern of wave form distribution (through directing of the wave form during the sensing cycle). For example, multiple sweeps can have the same duration (e.g., 50 ms, 100 ms, 200 ms, 300 ms, or other durations) and the same field-of-view (e.g., 60°, 90°, 180°, 360°, or other fields-of-view). Also, in some implementations, sensors 202 other than LIDAR sensors may similarly have a sensing cycle similar to the example sensing cycles for LIDAR sensors described herein.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally, or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental realignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system 240 can use different modalities of the sensor data 204 to generate a representation of the environment to be processed by the one or more algorithms or machine-learned model. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally, or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally, or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally, or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally, or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include waypoints (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

The autonomy system 200 can use the assistive signal(s) for input into one or more autonomy subsystems for performing autonomy functions. For instance, the planning system 250 can receive the assistive signal(s) as an input for generating a motion plan. For example, assistive signal(s) can include constraints for generating a motion plan. Additionally, or alternatively, assistive signal(s) can include cost or reward adjustments for influencing motion planning by the planning system 250. Additionally, or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
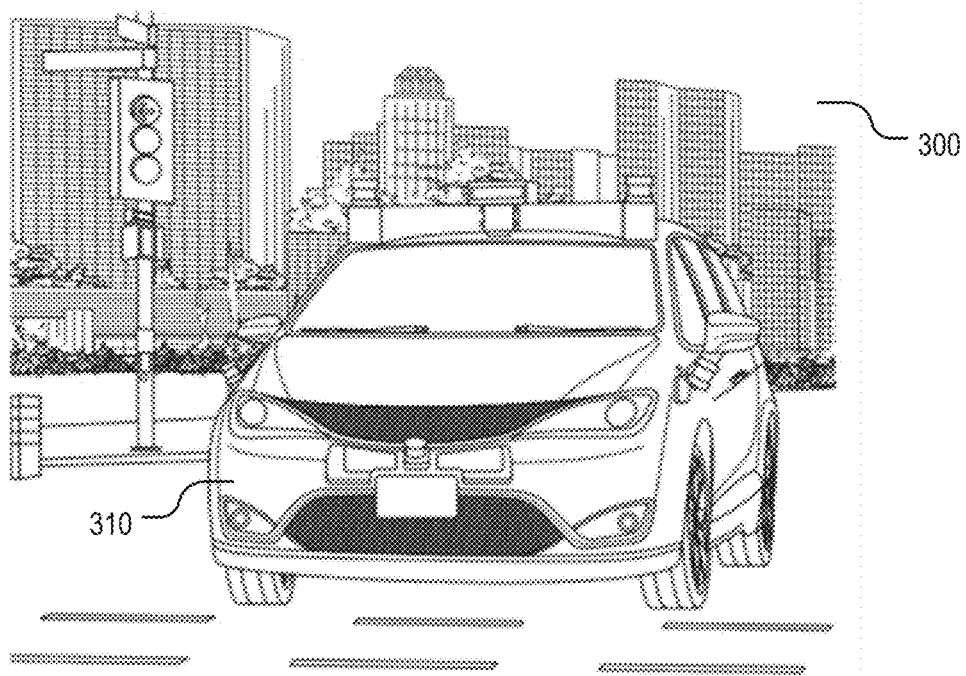
FIG. 3A shows an example environment including an example autonomous vehicle.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
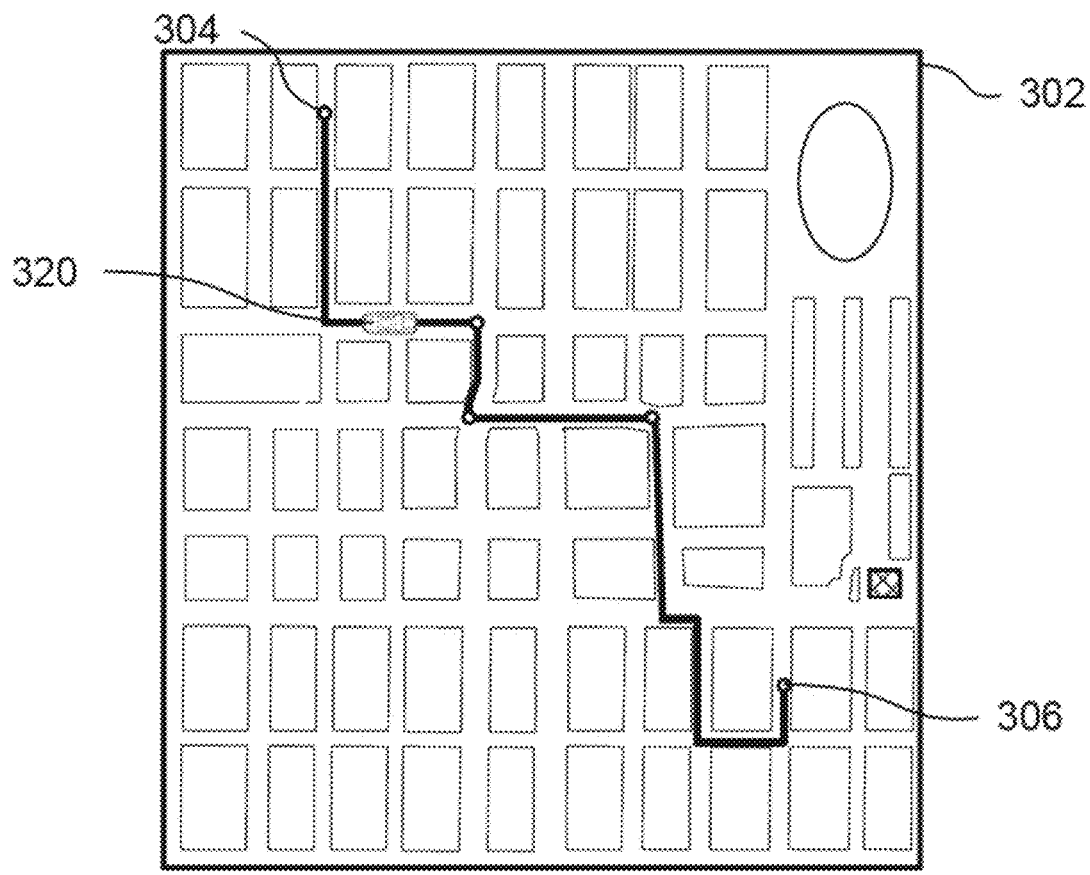
FIG. 3B is an overhead view of the example environment of FIG. 3A.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
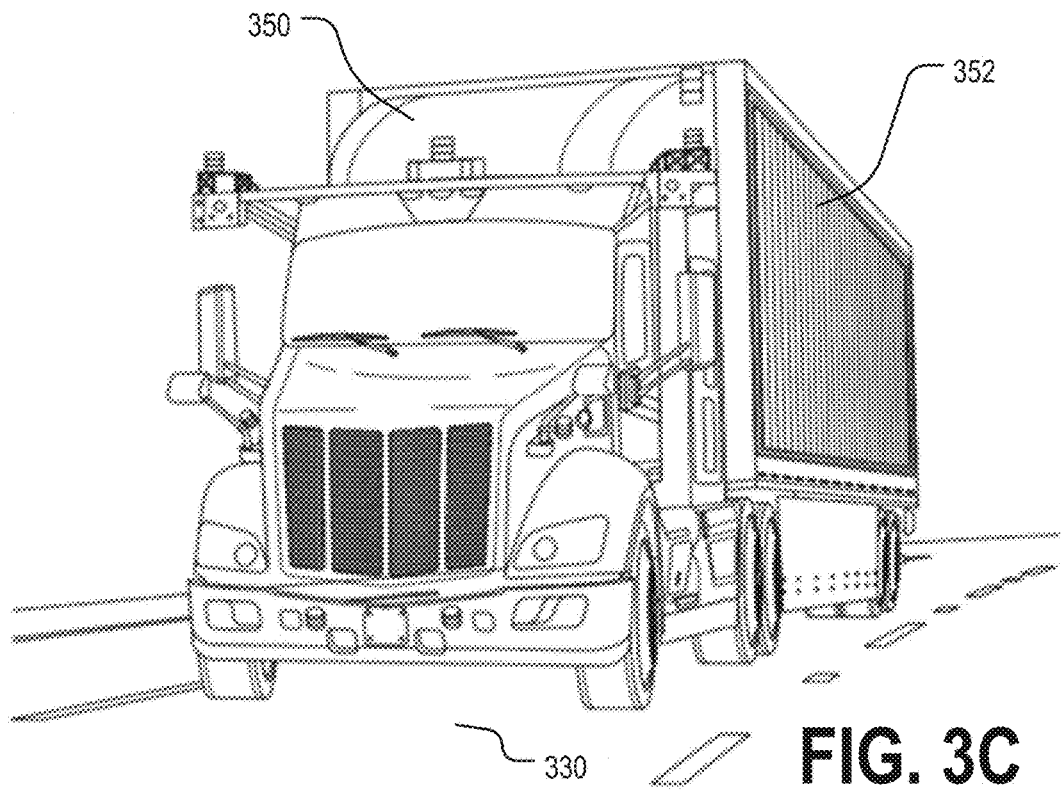
FIG. 3C shows another example environment including another example autonomous vehicle.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
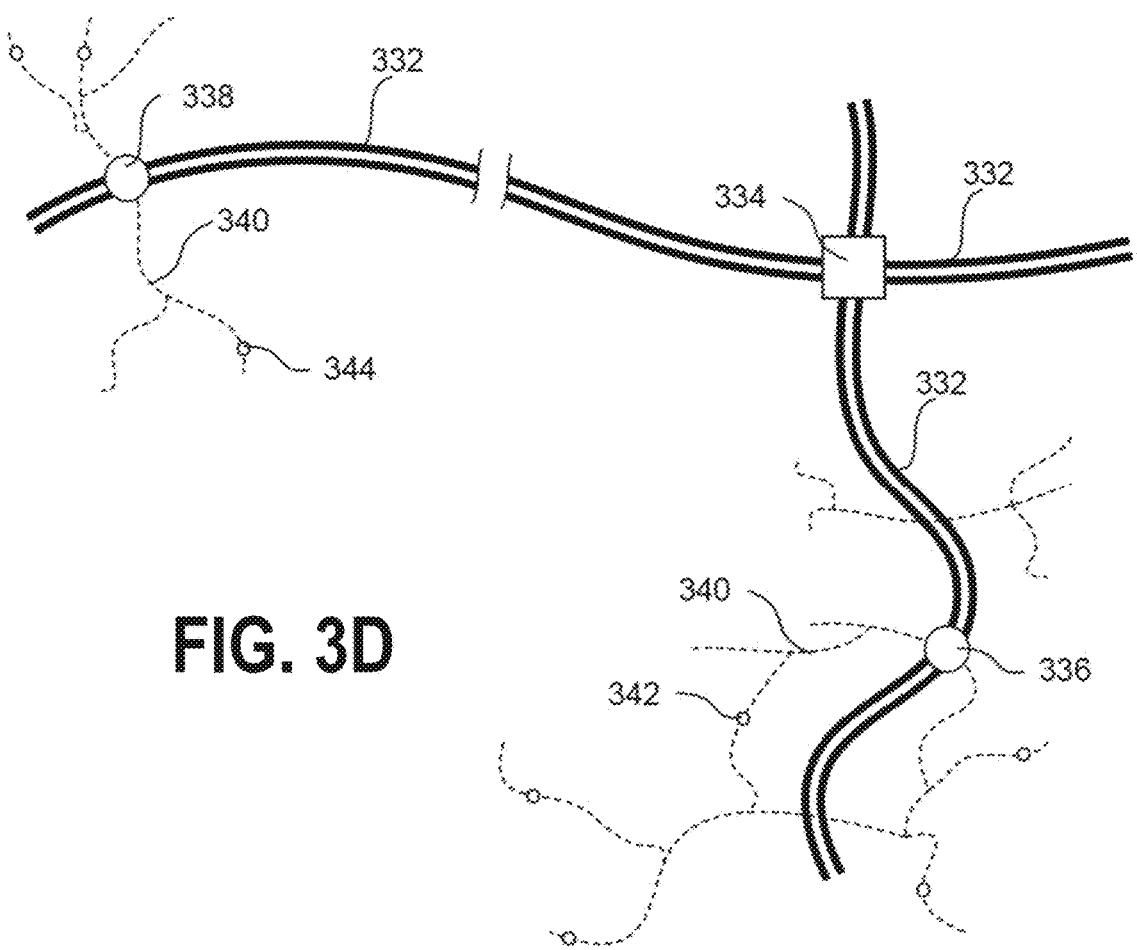
FIG. 3D is an overhead view of the example environment of FIG. 3C.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.)

for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338 and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

In some examples, some or all of the sensors 202 used by an autonomous platform, such as an autonomous vehicle, may concentrate sensing resources densely. This may result in sensors that generate data having a higher resolution, but in a smaller field-of-view. Consider an example LIDAR sensor having a scan pattern of N beams. The beams may be arranged in a vertical pattern and may be scanned through a horizontal sweep. The vertical field-of-view of the example LIDAR sensor may be based on the vertical spread of the N beams. The horizontal or azimuth field-of-view of the example LIDAR sensor may be based on the horizontal sweep of the scan. Concentrating the sensing resources of the example LIDAR sensor may include reducing the spread of the N beams in the vertical direction, for example, by using a smaller spread angle. This may limit the vertical field-of-view of the example LIDAR sensor, but increase the resolution of the sensor in the vertical direction. Similarly, the sensing resources of the example LIDAR sensor may be concentrated in the horizontal direction by limiting the horizontal sweep of the scan. This may also increase the resolution of the data generated by the example LIDAR sensor, at least because the sensor may be able to execute more cycles of a smaller horizontal sweep in a given time period. Limiting the horizontal sweep of the example LIDAR sensor, however, also limits the horizontal field-of-view.

In various examples, some or all of the sensors 202 may have a field-of-view that is movable or steerable. A sensor having a movable or steerable field-of-view is referred to herein as a steerable sensor. Consider an example steerable LIDAR sensor. Such a sensor may comprise optical components that direct the N beams to pivot the N beams in the vertical direction and/or optical components that modify the horizontal or azimuth sweep of the N beams. The steerable LIDAR sensor may be responsive to a control signal to steer the field-of-view in the vertical and/or azimuth direction.

When an autonomous vehicle uses one or more sensors having a steerable field-of-view, it may be desirable for the autonomous vehicle to set the field-of-view for such sensors. In some examples, an autonomous vehicle may select a static field-of-view for a steerable sensor such that the sensor's field-of-view is in a position most likely to be advantageous for the autonomous vehicle. This approach, however, can lead to situations where the field-of-view of the steerable sensor is not optimally positioned for the autonomous vehicle. For example, as the autonomous vehicle turns, the field-of-view of the steerable sensor may not be optimally positioned. Also, for example, if the autonomous vehicle is traveling on a travel way having a variable grade, a fixed field-of-view for a steerable sensor may not be optimally positioned as the grade of the travel way changes.

Various examples described herein are directed to systems and methods for steering the field-of-view of one or more sensors of an autonomous vehicle. The autonomy system 200 or other suitable system of an autonomous vehicle may be configured to select a goal location in the environment of the autonomous vehicle. In some examples, the goal location is on a travel way in the environment. The goal location may be on a travel way that is part of a route to be executed by an autonomous vehicle and/or may be on a travel away that is not part of a route to be executed by the autonomous vehicle. For example, a goal location may be selected on a travel way that is not part of a route to be executed by an autonomous vehicle, but is on a travel away that may be used by other vehicles that may enter a travel way being traversed by the autonomous vehicle.

The autonomy system 200 may apply various other parameters to determine the goal location. In some examples, the goal location is selected to be within a range of distances from a position of the autonomous vehicle and within a field-of-regard of the one or more sensors. Also, in some examples the goal location is selected to be on a travel way that is part of a route being executed by the autonomous vehicle.

The autonomy system 200 may be programmed to determine a field-of-view position for the steerable sensor so that the steerable sensor is directed to the goal location (e.g., so that the goal location is within the field-of-view of the sensor). The autonomy system 200 may select the field-of-view position using pose data describing a position of the autonomous vehicle in the environment and sensor position data describing a position of the steerable sensor (e.g., relative to the autonomous vehicle). The autonomy system 200 may send a field-of-view control signal to the steerable sensor instructing the steerable sensor to steer its field-of-view to the determined field-of-view position.

Figure 4:
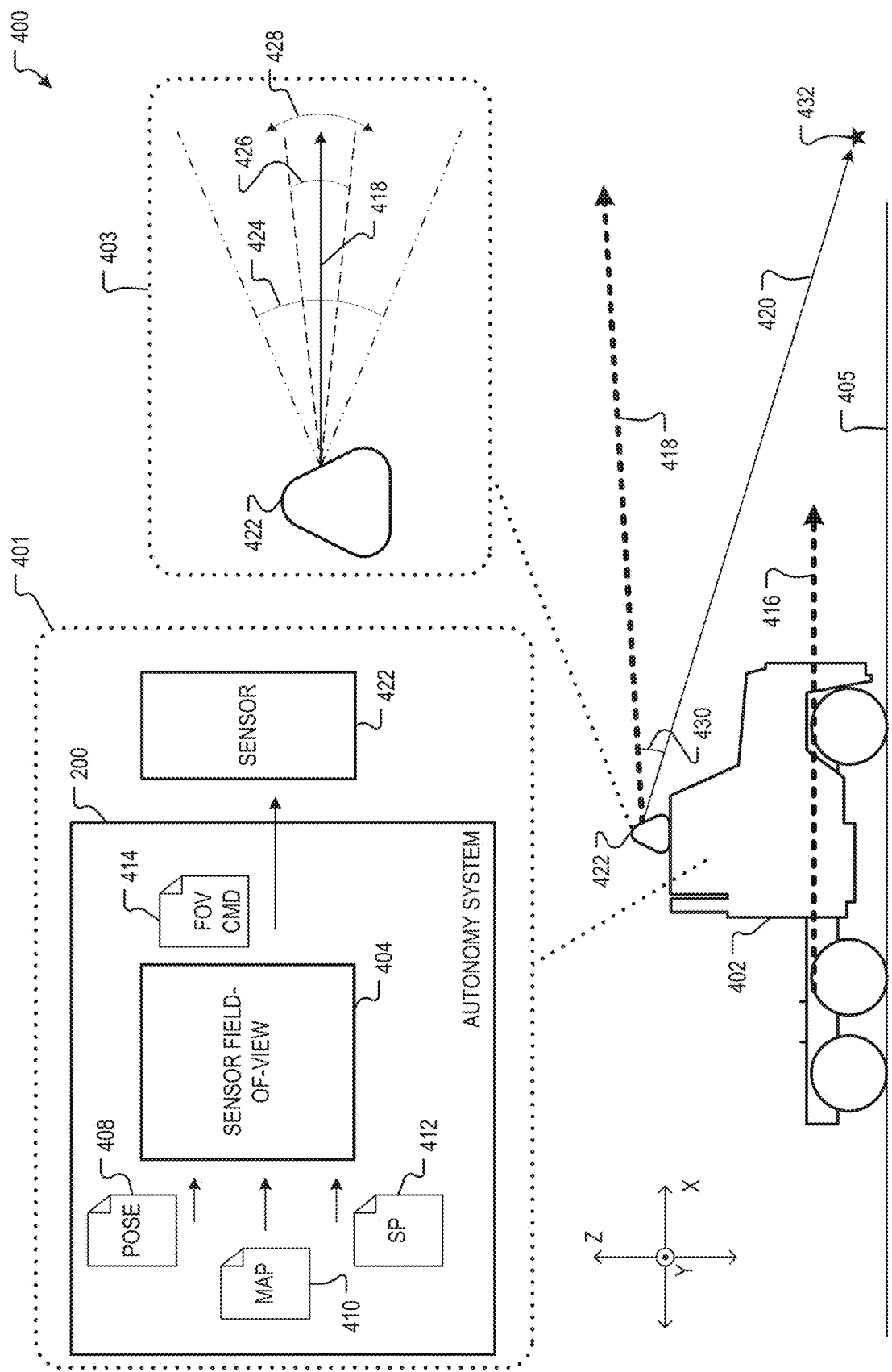
FIG. 4 is a diagram showing one example of an environment including an autonomous vehicle traveling on a travel way.

FIG. 4 is a diagram showing one example of an environment 400 including an autonomous vehicle 402 traveling on a travel way 405. In this example, the autonomous vehicle 402 is a tractor. In some examples, although not shown in FIG. 4, the autonomous vehicle 402 may pull a trailer 502 (for example, as in FIGS. 5, 9, and 12).

The autonomous vehicle 402 comprises a steerable sensor 422. The steerable sensor 422 may be or include any suitable sensor or sensor type such as, for example, a LIDAR sensor, a RADAR sensor, an optical image capturing device, or the like. In some examples the sensor 422 may be arranged in a manner similar to that described with respect to the sensors 202 of FIG. 2. For example, the steerable sensor 422 may generate sensor data similar to the sensor data 204, also described with respect to FIG. 2. Also, although a single steerable sensor 422 is shown in FIG. 4, it will be appreciated that the autonomous vehicle 402 may include multiple sensors, for example, as illustrated in more detail in FIG. 5. It will be appreciated, that an autonomous vehicle, such as the autonomous vehicle 402, may include both steerable and non-steerable sensors. In examples in which an autonomous vehicle includes both steerable and non-steerable sensors, the steerable sensors may be managed as described herein while non-steerable sensors may maintain a static field-of-view.

FIG. 4 illustrates a sensor direction 418 and a vehicle direction 416. The vehicle direction 416 indicates a direction in which the autonomous vehicle 402 is oriented. The sensor direction 418 indicates a direction in which the steerable sensor 422 is oriented. In some examples, the sensor direction 418 indicates a center of a field-of-view of the steerable sensor 422.

FIG. 4 also includes a breakout window 403 showing additional details of the steerable sensor 422. The breakout window 403 illustrates the steerable sensor 422 and the sensor direction 418 as well as a vertical field-of-view 426 of the steerable sensor 422 and a vertical field-of-regard 424 of the steerable sensor 422. The field-of-view of the steerable sensor 422 may be an area in the environment 400 that is observable by the steerable sensor 422. In the example of FIG. 4, the steerable sensor 422 is shown in cross-section along the vertical axis or Z axis. Accordingly, the vertical field-of-view 426 is a component of the field-of-view of the steerable sensor 422 in the vertical or Z axis direction. The vertical field-of-regard 424 may be a range within which the vertical field-of-view 426 can be moved.

Figure 5:
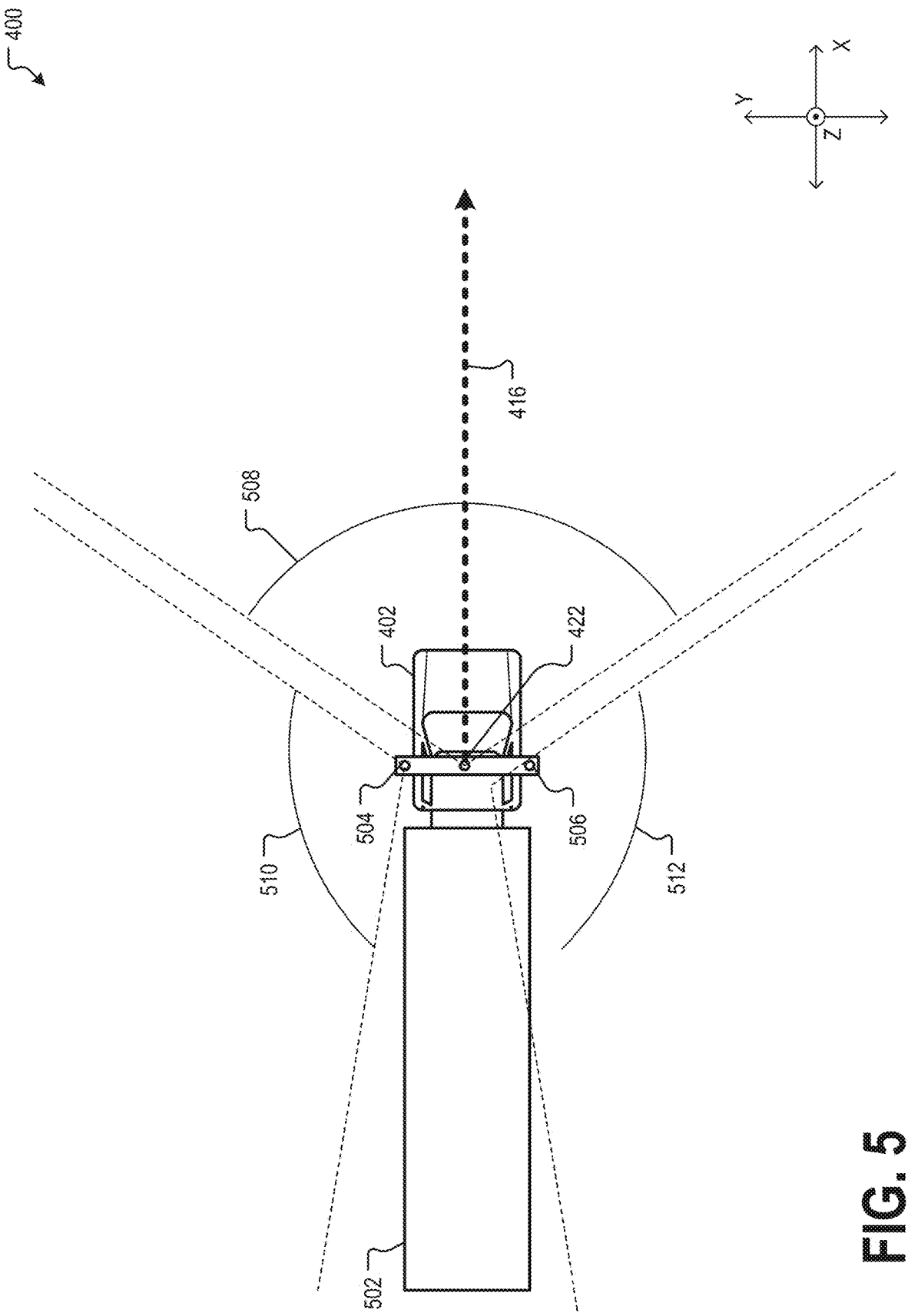
FIG. 5 is a diagram showing another example of the environment of FIG. 4 viewing the autonomous vehicle from a top-down view.

It will be appreciated that the field-of-view of the steerable sensor 422 may also have a horizontal or azimuth component along a plane parallel to the X-Y plane shown in FIG. 4. FIG. 5 is a diagram showing another example of the environment 400 of FIG. 4 viewing the autonomous vehicle 402 from a top-down view parallel to the Z axis. The top-down view shown in FIG. 5 illustrates an example azimuth field-of-view 508 for the steerable sensor 422. In some examples, the azimuth field-of-view 508 for the steerable sensor 422 may be fixed. In these examples, the steerable sensor 422 may modify its vertical field-of-view 426, as indicated by arrow 428 and described herein.

In some examples, the steerable sensor 422 may be or include a LIDAR sensor. For example, the steerable sensor 422 may comprise transmitter optics and receiver optics. (In some examples, the steerable sensor 422 may be a monostatic LIDAR sensor in which the transmitter optics and receiver optics are implemented in a common assembly.) The transmitter optics may generate an array of N beams that are transmitted into the environment 400. The beams may be reflected back to the steerable sensor 422 by objects in the environment 400, generating a return signal. The return signal is detected by the receiver optics of the steerable sensor 422. Sensor data generated by the steerable sensor 422 may be and/or be based on the return signal.

The array of N beams may be spread vertically in the Z axis along the vertical field-of-view 426. In some examples, the spacing of the N beams may determine a resolution of the steerable sensor 422. The array of N beams may be periodically scanned along the azimuth field-of-view 508. The N beams of the array may be arranged in a scan pattern with adjacent beams separated by a beam angle. The number of beams N may be any suitable number such as, for example, six beams, twelve beams, twenty-four beams, thirty-two beams, sixty-four beams, etc. the angle separating the N beams of the array may be any suitable angle such as, for example, $\frac{1}{10}°$, $\frac{1}{12}°$, $\frac{1}{6}°$ and/or the like.

The array of N beams may be implemented progressively using N separate beam sources, or in an interlaced manner using fewer than N separate beam sources. In one interlaced example, a sixty-four beam scan pattern with $\frac{1}{24}°$ spread between beams may be implemented using an array of sixteen beams separated by $\frac{1}{6}°$. For example, the sixteen-beam array may be scanned across the azimuth field-of-view 508 four times per sensor cycle, with each scan being offset in the Z axis direction by $\frac{1}{24}°$. It will be appreciated that the steerable sensor 422 may be any suitable type of sensor. It will also be appreciated that, in examples in which the steerable sensor 422 is a LIDAR sensor, it may be implemented using a beam array comprising any suitable number of beams generated in a progressive and/or interlaced manner.

FIG. 4 also shows a breakout window 401 showing an example of the autonomy system 200 including a sensor field-of-view system 404. The sensor field-of-view system 404 may generate a field-of-view command 414 that is provided to the steerable sensor 422 to cause the steerable sensor 422 to modify its field-of-view. In examples in which the steerable sensor 422 has a fixed azimuth field-of-view 508, the field-of-view command 414 may indicate a position of the vertical field-of-view 426 within the vertical field-of-regard 424.

The sensor field-of-view system 404 may generate the field-of-view command 414 based on pose data 408, map data 410, and sensor position data 412. The pose data 408 may describe a position or pose of the autonomous vehicle 402. For example, the pose data 408 may indicate where the autonomous vehicle 402 is located in the environment 400 and an orientation of the autonomous vehicle 402, for example, in 6-degrees.

The map data 410 may describe the environment 400 including travel ways as well as landmarks such as, for example, buildings, hills, bridges, tunnels, and/or the like. For example, the map data 410 may include travel way data describing the position of travel ways in the environment 400 and ground data describing the position of the ground in the environment 400.

The sensor position data 412 may indicate a position and/or orientation of the steerable sensor 422. In some examples, the sensor position data 412 describes the position and/or orientation of the sensor 422 relative to the autonomous vehicle 402. For example, the sensor position data 412 may have been generated during a calibration operation for calibrating the steerable sensor 422.

The sensor field-of-view system 404 may be programmed to select a goal location 432 in the environment 400. The goal location 432 may represent a location in the environment 400 that it is desirable for the autonomous vehicle 402 to sense. In some examples, the goal location 432 is determined using the map data 410 and the pose data 408. For example, the sensor field-of-view system 404 may apply one or more goal conditions to the map data 410 to select the goal location 432. One example goal condition may be that the goal location 432 be within a field-of-regard of the steerable sensor 422. That is, the sensor field-of-view system 404 may not select a candidate location as a goal location 432 unless the field-of-view of the steerable sensor 422 may be steered to a position such that the goal location 432 is within the field-of-view of the steerable sensor 422.

Another example goal condition may be that the goal location 432 is within a range of distances from the autonomous vehicle 402. Another example goal condition may be that the goal location 432 is on a travel way in the environment 400. Another example goal condition may be that the goal location 432 is the location farthest from the autonomous vehicle 402 that meets the other goal conditions. For example, the goal location 432 may be the position on a travel way that is farthest from the autonomous vehicle 402 while still being within a range of distances from the autonomous vehicle 402. In another example, the goal conditions may include a goal condition that the goal location 432 be on a route that is being executed by the autonomous vehicle.

The sensor field-of-view system 404 may use the goal location 432 to determine a field-of-view position for the steerable sensor 422. For example, the sensor field-of-view system 404 may select a position for the field-of-view 426 of the steerable sensor 422 such that the goal location 432 is within the field-of-view 426.

In some examples, the sensor field-of-view system 404 uses the map data 410 and the pose data 408 to determine a line from a position of the autonomous vehicle 402 to the goal location 432. Using the sensor position data 412, the sensor field-of-view system 404 may translate the line from the position of the autonomous vehicle to the goal location 432 to a line 420 from a position of the steerable sensor 422 to the goal location 432. In some examples, an angle 430 between the sensor direction 418 and the line 420 may indicate a position for the field-of-view 426 such that the goal location 432 will be within the field-of-view 426. In the example of FIG. 4, the angle 430 is a two-dimensional angle in a plane parallel to the X-Z axis. In examples in which the azimuth field-of-view 508 and the vertical field-of-view 426 are steerable, the angle 430 may be a three-dimensional angle. In examples where the azimuth field-of-view 508 of the steerable sensor 422 is steerable and the vertical field-of-view 426 is static, the angle 430 may be a two-dimensional angle in a plane parallel to the X-Y axis. From the relative positions and orientations of the steerable sensor 422 and the goal location 432, the sensor field-of-view system 404 may determine a field-of-view command 414 indicating a position for the field-of-view 426 of the steerable sensor 422. In various examples, the command 414 may indicate the vehicle direction 416.

The view of the environment 400 shown in FIG. 5 illustrates an azimuth field-of-view 508 of the steerable sensor 422. FIG. 5 also illustrates other example features. For example, in the depiction of FIG. 5, the autonomous vehicle 402 is a tractor that is pulling a trailer 502. FIG. 5 also shows additional steerable sensors 504, 506. The steerable sensor 504 has an azimuth field-of-view 510. The steerable sensor 506 has an azimuth field-of-view 512. It will be appreciated that, in some examples, the steerable sensors 504, 506 may be steerable in a vertical direction, similar to the steerable sensor 422. In some examples, the steerable sensors 504, 506 may also be steerable in an azimuth direction, as described herein. In examples that include more than one steerable sensor, the sensor field-of-view system 404 may be configured to select fields-of-view for each steerable sensor. For example, the sensor field-of-view system 404 may select a goal location for each steerable sensor 422, 504, 506. The sensor field-of-view system 404 may translate the respective goal locations for each steerable sensor 504, 506, 422 into positions for the respective fields of view of the respective steerable sensors 422, 504, 506. The sensor field-of-view system 404 may send a respective field-of-view command, such as the field-of-view command 414, to the respective sensors.

Figure 6:
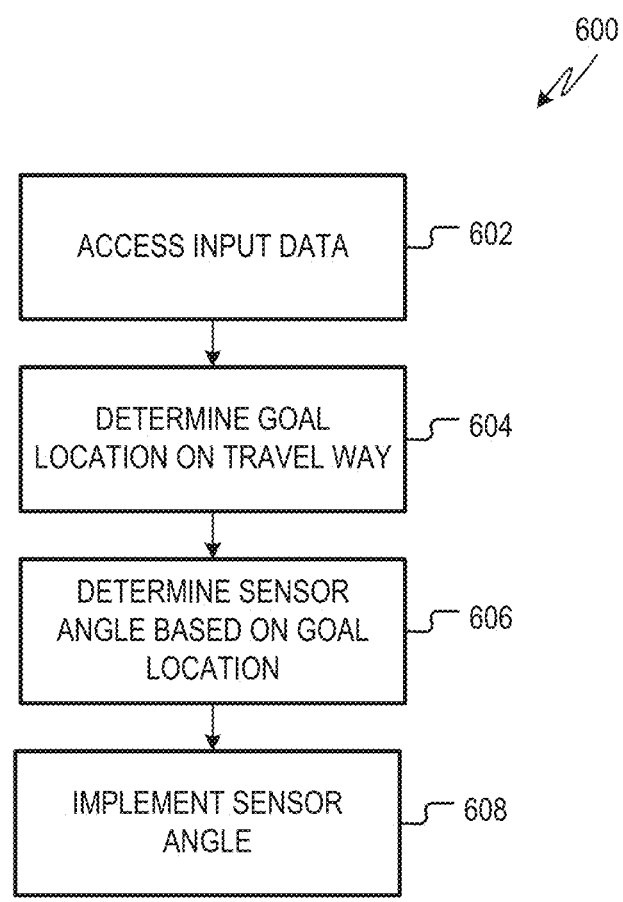
FIG. 6 is a flowchart showing one example of a process flow that may be executed in the autonomy system of FIG. 2 to manage the field-of-view of a steerable sensor.

FIG. 6 is a flowchart showing one example of a process flow 600 that may be executed in the autonomy system 200 (e.g., by the sensor field-of-view system 404 thereof) to manage the field-of-view of a steerable sensor. The process flow 600 is described with respect to the steerable sensor 422. It will be appreciated, however, that, in some examples, the process flow 600 may be separately executed to manage the fields-of-view of multiple steerable sensors.

At operation 602, the autonomy system 200 may access input data. The input data may comprise pose data 408, map data 410, and sensor position data 412. At operation 604, the autonomy system 200 may determine a goal location on a travel way. For example, the autonomy system 200 may apply one or more goal conditions to the map data 410 to select an appropriate goal location for the steerable sensor.

At operation 606, the autonomy system 200 may determine a sensor angle to direct the field-of-view of the steerable sensor towards the goal location. As described herein, the angle may be a two-dimensional angle, for example, if the steerable sensor has a field-of-view that is steerable in two dimensions, or a three-dimensional angle, for example, if the steerable sensor has a field-of-view that is steerable in three dimensions.

At operation 608, the autonomy system 200 may implement the sensor angle determined that operation 606. This may include providing a field-of-view command, such as the field-of-view command 414, to the steerable sensor. The steerable sensor may respond to the field-of-view command by steering its field-of-view to the position indicated by the angle.

In some examples, the process flow 600 may be executed multiple times, for example, concurrently. Each instance of the process flow 600 may be executed for a different steerable sensor 422, 504, 506 of the autonomous vehicle 402. In some examples, an instance of the process flow 600 executed may be constrained to select goal positions within a field-of-regard of the respective steerable sensors 422, 504, 506. For example, a goal location for the steerable sensor 422 may be within a field-of-regard of the steerable sensor 422. A goal location for the steerable sensor 504 may be within a field-of-regard for the steerable sensor 504. A goal location for the steerable sensor 506 may be within a field-of-regard for the steerable sensor 506, and so on.

Figure 7:
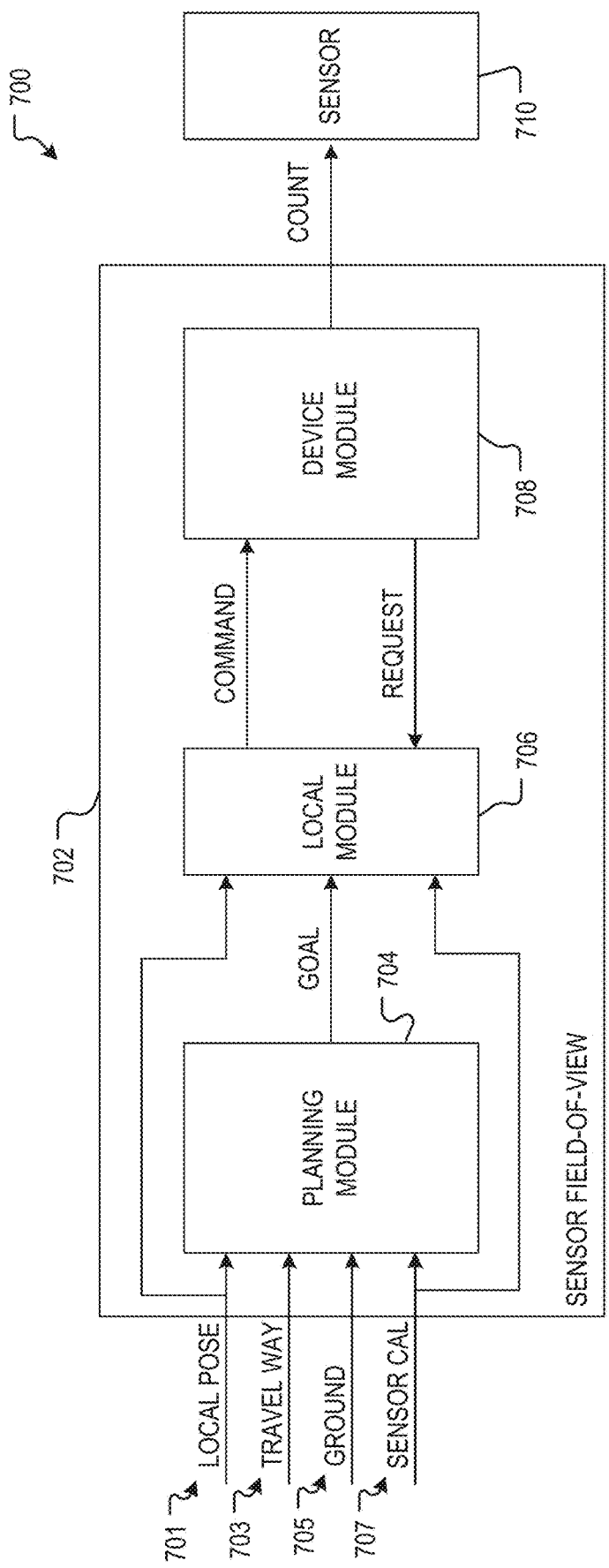
FIG. 7 is a diagram showing one example implementation of a sensor field-of-view system.

FIG. 7 is a diagram 700 showing one example implementation of a sensor field-of-view system 702. The sensor field-of-view system 702 may be implemented as a component in conjunction with an autonomy system associated with an autonomous vehicle, such as the sensor field-of-view system 404 and the autonomy system 200.

The sensor field-of-view system 702 may receive input data including local pose data 701, travel way data 703, ground data 705, and sensor calibration data 707. The local pose data 701 may indicate a position of an autonomous vehicle, such as, a position and orientation of the autonomous vehicle. In some examples, the local pose data 701 is determined by a localization system of the autonomy system, such as the localization system 230 shown in FIG. 2.

Travel way data 703 and ground data 705 may be provided separately, or provided together as map data. Travel way data 703 may indicate the positions of one or more travel ways in the environment of the autonomous vehicle. Ground data 705 may indicate the position of the ground in the environment of the autonomous vehicle. In some examples, the ground data 705 may also indicate landmarks in the environment of the autonomous vehicle such as, for example, buildings, hills, bridges, tunnels, and/or the like. The sensor calibration data 707 may indicate a position of the steerable sensor, for example, relative to a position of the autonomous vehicle.

In this example, the sensor field-of-view system 702 comprises a planning module 704, a local module 706, and a device module 708. In some examples, the various modules 704, 706, 708 are implemented in hardware, software, and/or the like. The planning module 704 may operate in a map domain. The map domain may be a three-dimensional space described by the map data such as, for example, the travel way data 703 and the ground data 705. The planning module 704 may utilize the local pose data 701 to translate a location of the autonomous vehicle from a vehicle domain (e.g., a three-dimensional space described by the local pose data 701) into the map domain. Using the location of the autonomous vehicle, the planning module 704 may select a goal location for the steerable sensor. For example, the planning module 704 may apply one or more goal conditions to select the goal location in the map domain.

In some examples, the local pose data 701 may be determined, for example by a localization system of the autonomous vehicle, without using sensor data from the steerable sensor. In this way, inputs to the sensor field-of-view system 702 may be independent of the steerable sensor 422. It may be desirable, in some examples, to keep the output of the sensor field-of-view system 702 independent from sensor data generated by the steerable sensor. This, in some examples, may prevent destructive feedback.

The planning module 704 may provide the determined goal location to the local module 706. The local module 706 may also receive the local pose data 701 and the sensor calibration data 707, which may include sensor position data. The local module 706 may translate the goal location from the map domain to a sensor domain. This may include, for example, using the local pose data 701 to translate the goal location from the map domain to the vehicle domain. The local module 706 may further utilize the sensor calibration data 707 to translate the goal location from the vehicle domain to the sensor domain. The result may be an angle, such as the angle 430, describing a position of the field-of-view of the steerable sensor that will include the goal location.

The local module 706 may generate a field-of-view command that is provided to the device module 708. The device module 708 may convert the field-of-view command to a corresponding command signal that may be provided to the steerable sensor 710. The device module 708 may provide the command signal to the steerable sensor 710, which may cause the steerable sensor 710 to assume the field-of-view position described by the command signal. In some examples, the command signal is a digital-to-analog count. The digital-to-analog count, for example, may be provided to a digital-to-analog converter, which may generate an analog signal that is used by the steerable sensor 710 to assume the desired field-of-view position. The digital-to-analog converter may be a component of the sensor field-of-view system 702, a component of the steerable sensor 710, and/or a component of the autonomy system 200.

In some examples, the device module 708 is also configured to periodically generate a request message that is directed to the local module 706. The request message may request that the local module 706 update its processing and produce a field-of-view command. In some examples, the request message is generated by the device module 708 and may be synchronized with the operations of the steerable sensor 710. For example, some steerable sensors may have an operation cycle, such as a cycle for sweeping through the selected field-of-view. In some steerable sensors, there may be portions of the sensor cycle where it is more advantageous to adjust the position of the sensor field-of-view. The device module 708 may be configured to generate request messages such that the local module 706 provides field-of-view commands at a time in the sensor cycle of the steerable sensor 710 at which it is convenient to implement a change in the field-of-view.

Figure 8:
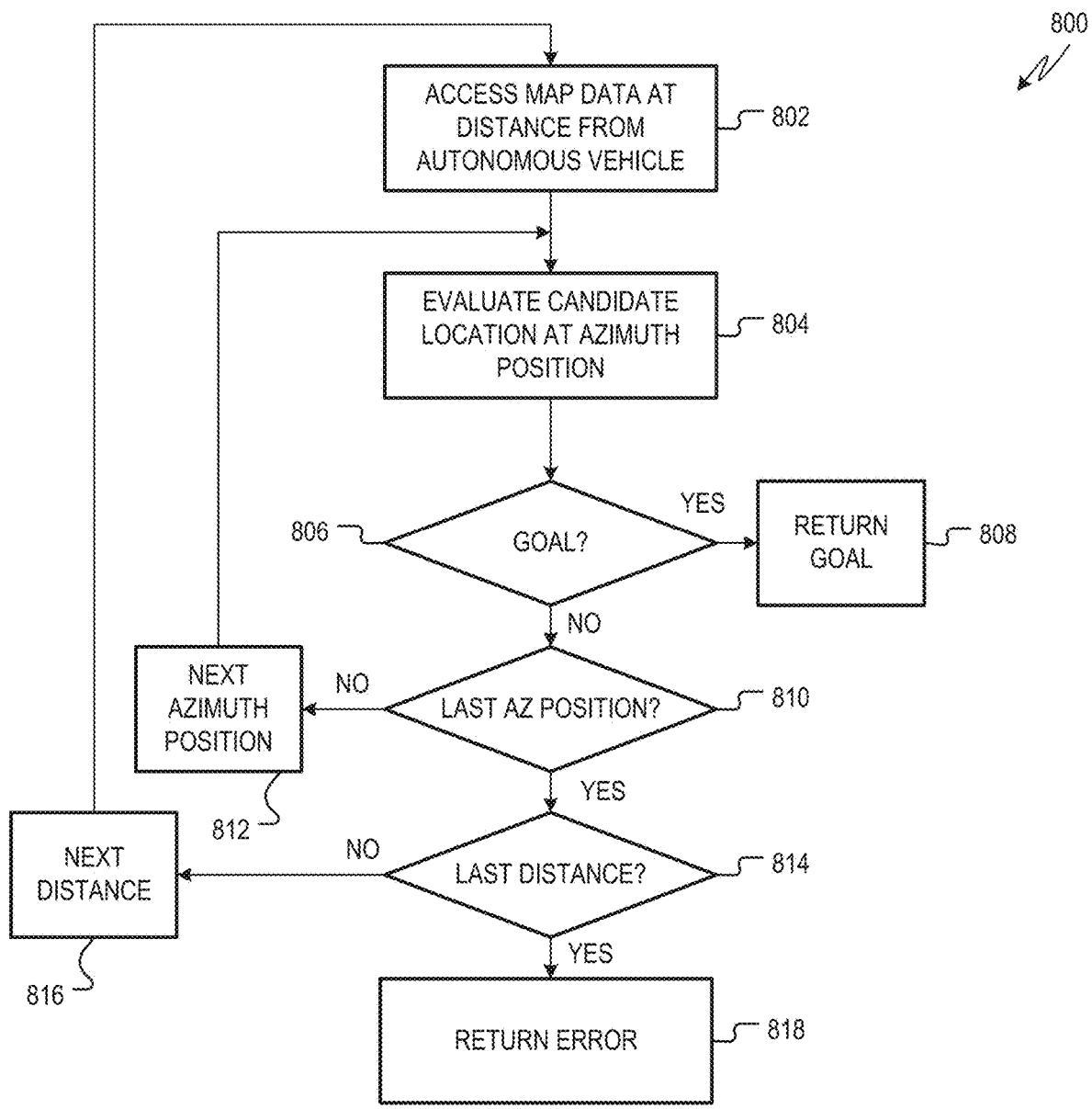
FIG. 8 is a flowchart showing one example of a process flow that may be executed to select a goal location for a steerable sensor.

FIG. 8 is a flowchart showing one example of a process flow 800 that may be executed by an autonomy system 200 of the autonomous vehicle 402 to select a goal location for a steerable sensor, such as the steerable sensor 422. The process flow 800 executes two loops, an inner loop and an outer loop. The outer loop includes operations 802, 804, 806, 810, 814, and 816. The inner loop includes operations 804, 806, 810, and 812.

As will be described in more detail herein, the outer loop is configured to cycle through candidate locations at different distances from the autonomous vehicle 402. For example, the outer loop may execute for every distance from the autonomous vehicle 402 that is within a range of distances from the autonomous vehicle 402, where the range of distances may be indicated by a goal condition. For each distance considered by the outer loop, the inner loop may consider a range of candidate locations at different azimuth positions along the considered distance. In this way, the structure of the process flow 800 may implement a goal condition that the goal location be within a range of distances from the autonomous vehicle 402 corresponding to the range of distances considered by the outer loop.

Depending on implementation, the process flow 800 may also implement other goal conditions. For example, if the outer loop is executed starting from distances that are farthest from the autonomous vehicle 402, then the process flow 800 may return a goal location within the range of distances that is farthest from the autonomous vehicle 402. Conversely, if the outer loop is executed starting from a distance in the range that is closest to the autonomous vehicle 402, then the process flow 800 may return a goal location within the range of distances that is closest to the autonomous vehicle 402.

Also, in some examples, the way in which the inner loop is executed applies a goal condition related to the azimuth position of the goal location. For example, the inner loop may be executed starting at a position that intersects the vehicle direction 416 of the autonomous vehicle 402 and then progressing outwards from the starting position. This may implement a goal condition that the goal location be the closest location to the vehicle direction 416 that meets the other goal conditions.

At operation 802, the autonomy system 200 may access map data describing portions of an environment of the autonomous vehicle 402 that are a first distance from the autonomous vehicle 402. In some examples, the first distance may be the farthest distance of the range of distances that are being considered for candidate locations.

At operation 804, the autonomy system 200 may evaluate a candidate location from a portion of the map data accessed at operation 802 that is at a first azimuth position. In some examples, the first azimuth position is a position at the first distance that intersects or otherwise aligns with the vehicle direction 416.

At operation 806, the autonomy system 200 may determine if the candidate location evaluated at operation 804 is the goal location. This may include comparing one or more additional goal conditions to the candidate location. The additional goal conditions may be goal conditions that are not implemented by the structure of the process flow 800, as described herein. In some examples, the autonomy system 200 may apply a goal condition that involves determining whether the candidate location is on a travel way. In another example, the autonomy system 200 may apply a goal condition that involves determining whether the candidate location is on a travel way that is part of a route being executed by the autonomous vehicle 402. Other example goal conditions that may be applied at operation 806 are described herein, for example, with respect to FIGS. 10-15.

If the candidate location considered at operation 806 complies with all of the goal conditions, the autonomy system 200 may return the candidate location as the goal location at operation 808. If the candidate location does not meet all of the goal conditions at operation 806, the autonomy system 200 may move to a next candidate location. For example, at operation 810, the autonomy system 200 may determine if the current candidate location was at the last azimuth position to be considered at the current distance from the autonomous vehicle 402. In some examples, the autonomy system 200 may consider azimuth positions a full 360° around the autonomous vehicle 402. Also, in some examples the autonomy system 200 may consider azimuth positions within a range of angles about the autonomous vehicle 402, such as, for example, plus or minus X degrees relative to the vehicle direction 416.

If the current candidate condition is not the last azimuth position to be considered at the current distance from the autonomous vehicle 402, the autonomy system 200 may begin a next execution of the inner loop by considering a next azimuth position at the current distance at operation 812. The autonomy system 200 may return to operation 804 and evaluate a next candidate location at the next azimuth position.

In some examples, the autonomy system 200 is programmed to select the next azimuth position based on an angular distance to the vehicle direction 416. For example, the first azimuth position may align with the vehicle direction 416, as described herein. The second azimuth position may be offset from the vehicle direction 416 by an increment angle in a first direction. The third azimuth position may be offset from the vehicle direction 416 by the increment angle in a second direction opposite the first direction. A fourth azimuth position may be offset from the vehicle direction 416 by two times the increment angle in the first direction. A firth azimuth position may be offset from the vehicle direction 416 by two times the increment angle in the second direction, and so on.

If the autonomy system 200 determines at operation 810 that the current azimuth position is the last azimuth position to be considered at the current distance from the autonomous vehicle 402, then the autonomy system 200 may determine, at operation 814, whether the current distance from the autonomous vehicle 402 is the last distance within the range 908 (illustrated in FIG. 9) to be considered. If the current distance is the last distance within the range 908 be considered, and no goal location has been returned yet, then the autonomy system 200 may return an error at operation 818. If the current distance is not the last distance within the range 908 to be considered, the autonomy system 200 may begin a next execution of the outer loop by implementing to a next distance at operation 816 and returning to operation 802 to access map data at the next distance.

Figure 9:
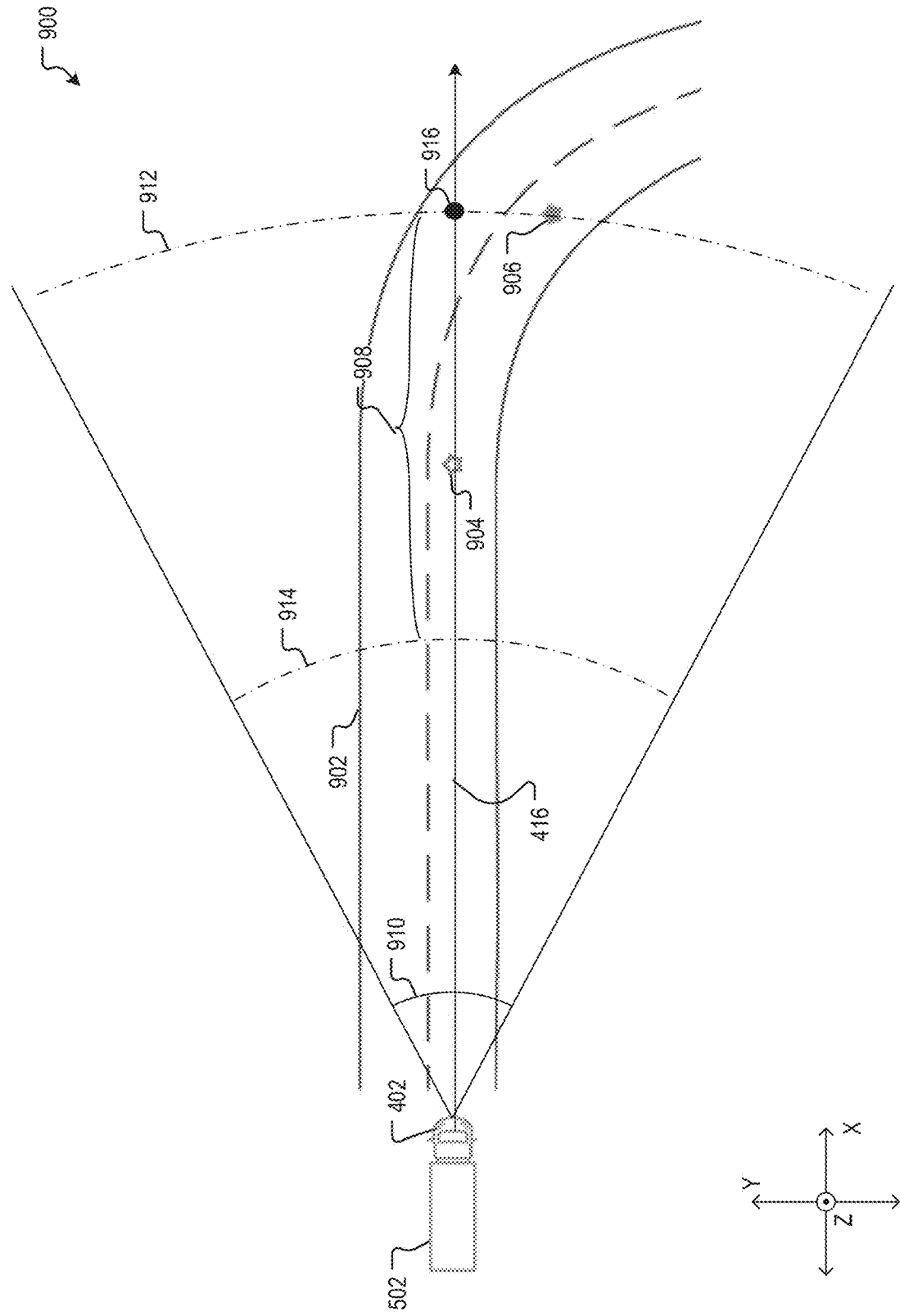
FIG. 9 is a diagram showing one example of an environment illustrating one example implementation of the process flow of FIG. 8.

FIG. 9 is a diagram showing one example of an environment 900 including the autonomous vehicle 402 and illustrating one example implementation of the process flow 800 of FIG. 8. The environment 900 includes a travel way 902. In the example environment 900, the autonomous vehicle 402 is traveling on the travel way 902 in the vehicle direction 416. In this example, the autonomy system 200 may consider a range 908 of distances from the autonomous vehicle 402 and a range of azimuth positions indicated by angle 910. The range 908 of distances may extend from a first distance 914 from the autonomous vehicle 402 to a second distance 912 from the autonomous vehicle 402.

In the example environment 900, the autonomy system 200 may, at operation 802, access map data describing locations at the distance 912. At operation 804, the autonomy system 200 may evaluate a first candidate location at a first azimuth position, which may be the azimuth position 916, where the vehicle direction 416 intersects the distance 912. In this example, the autonomy system 200 may determine, at operation 806, that the first candidate location does not meet all of the goal conditions that are being used. The autonomy system 200 may continue to consider other azimuth positions at the distance 912 (e.g., operations 810, 812, and so on). For example, as described herein, the autonomy system 200 may consider additional candidate locations that are increasingly farther from the vehicle direction 416. In this example shown in FIG. 9, the autonomy system 200 may find a candidate location 906 that meets all of the goal conditions that are being considered. The autonomy system 200 may return the candidate location 906 as the goal location at operation 808.

Note that the environment 900 also marks an additional candidate location 904. In the example described herein, the candidate location 904 may not be considered by the autonomy system 200 because the candidate location 906 meeting all of the goal conditions was encountered first.

Figure 10:
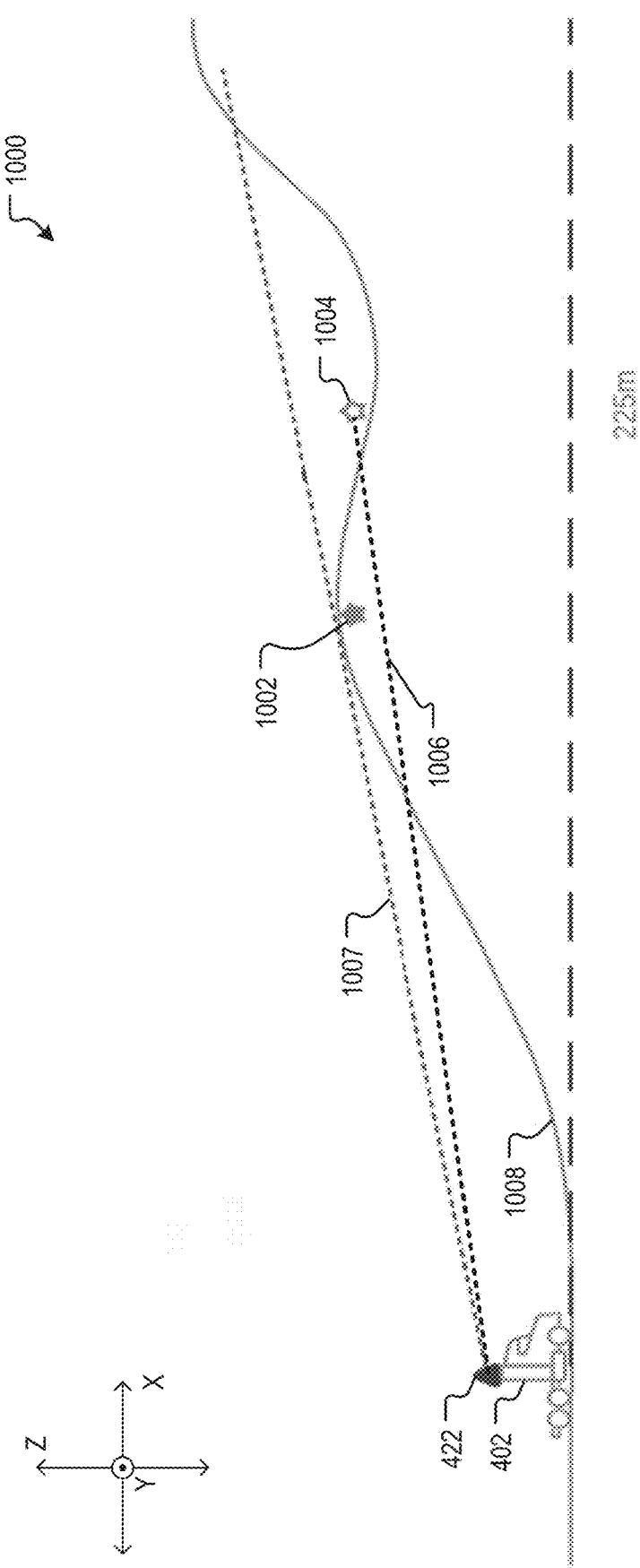
FIG. 10 is a diagram showing another example environment illustrating an example goal condition that a candidate location not be occluded to the steerable sensor.

FIG. 10 is a diagram showing another example environment 1000 including the autonomous vehicle 402 traversing a travel way 1008 and illustrating an example goal condition that a candidate location not be occluded to the steerable sensor. In the example environment 1000, the travel way 1008 is not flat. As a result, portions of the travel way 1008 are occluded to the steerable sensor 422. In other words, portions of the travel way 1008 are not visible to the steerable sensor 422. It may not be desirable for the steerable sensor 422 to be directed towards a location that is occluded. Accordingly, the autonomy system 200 may be configured to apply a goal condition that the goal location not be occluded relative to the steerable sensor 422.

FIG. 10, for example, shows a first candidate location 1004 and a second candidate location 1002. In this example, both candidate locations 1002, 1004 may meet some or all of the goal conditions under consideration. For example, both candidate locations 1002 and 1004 may be within a range of distances from the autonomous vehicle 402 and within a field-of-regard of the steerable sensor 422. As shown, however, the slope of the travel way 1008 may cause the candidate location 1004 to be occluded to the steerable sensor 422. For example, a line-of-sight 1006 from the steerable sensor 422 to the candidate location 1004 may intersect the surface of the travel way 1008. In the example of FIG. 10, the candidate location 1002 may not be occluded to the steerable sensor 422. For example, a line-of-sight 1007 from the steerable sensor 422 to the candidate location 1002 may not intersect the surface of the travel way 1008 or any other objects in the environment 1000. Accordingly, the candidate location 1002 may be selected as the goal location.

Figure 11:
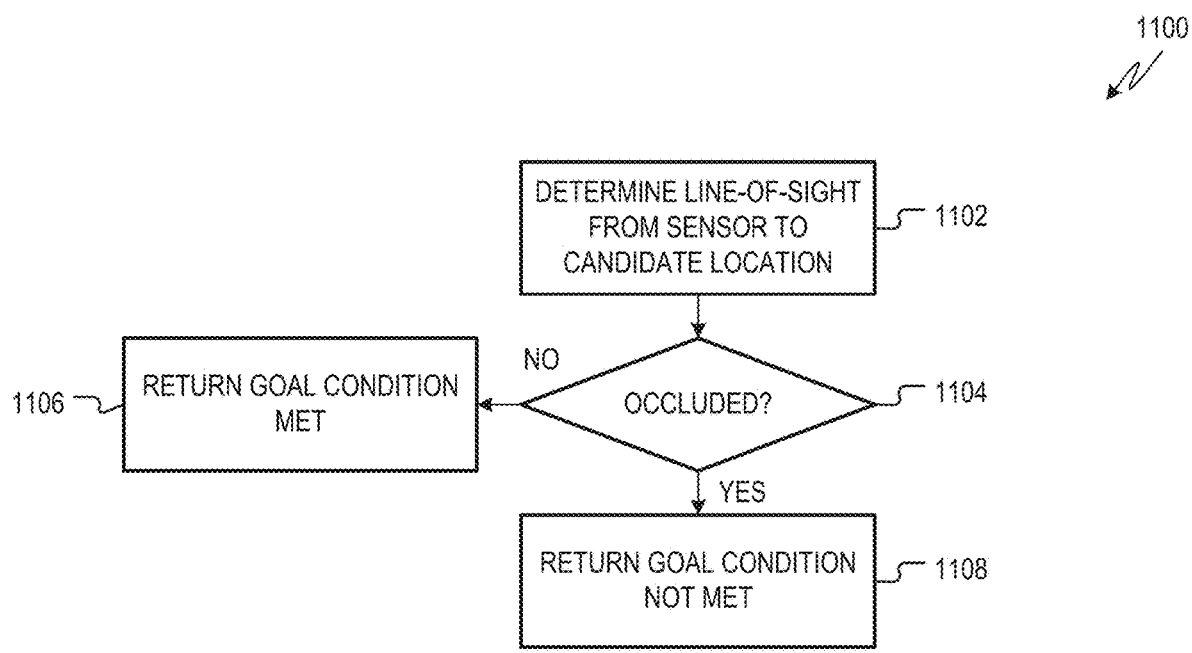
FIG. 11 is a flowchart showing one example of a process flow that may be executed to implement a goal condition that a candidate location not be occluded to the steerable sensor.

FIG. 11 is a flowchart showing one example of a process flow 1100 that may be executed by the autonomy system 200 to implement a goal condition that a candidate location not be occluded to the steerable sensor. For example, the process flow 1100 may be executed as part of the operation 806 of the process flow 800 to determine whether a candidate location is a goal location.

At operation 1102, the autonomy system 200 may determine a line-of-sight from the steerable sensor to a candidate location. At operation 1104, the autonomy system 200 may determine whether the candidate location is occluded. This may include comparing the line-of-sight to map data, such as ground data and/or data describing other objects in the environment of the autonomous vehicle 402. The candidate location may be occluded if the line-of-sight intersects the ground or other object indicated by the map data. If the candidate location is not occluded to the steerable sensor, the autonomy system 200 may return an indication that the goal condition is met at operation 1106. If the candidate location is occluded, the autonomy system 200 may return an indication that the goal condition is not met at operation 1108.

Figure 12:
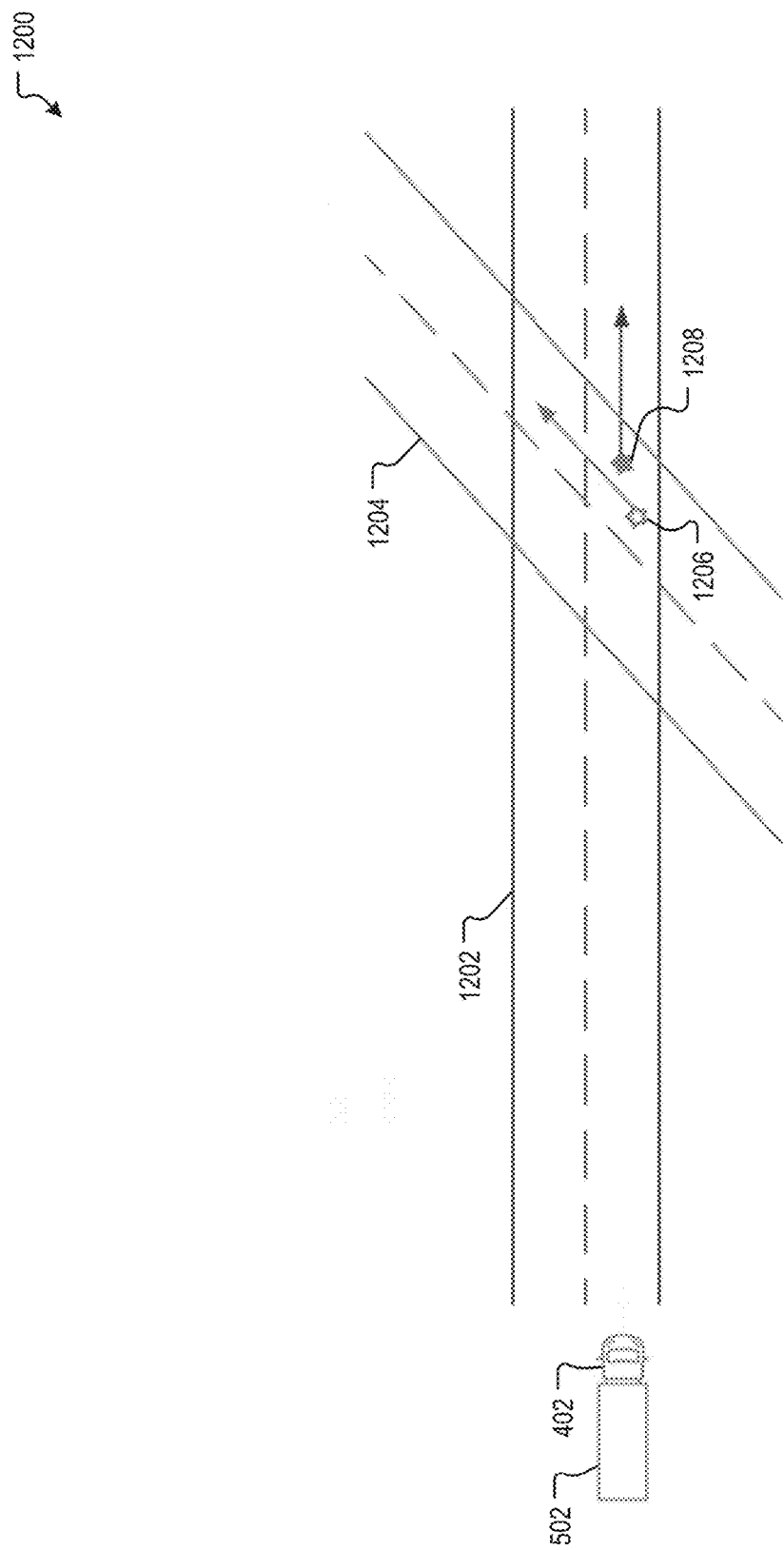
FIG. 12 is a diagram showing another example environment illustrating an example goal condition that a candidate location be on a travel way having a common vertical level with the travel way on which an autonomous vehicle is traversing.

FIG. 12 is a diagram showing another example environment 1200 including the autonomous vehicle 402 traversing a travel way 1202 and illustrating an example goal condition that a candidate location not be on a travel way 1204 at a vertical level different than that of the travel way 1202 on which the autonomous vehicle 402 is traversing. In the example environment 1200, the autonomous vehicle 402 is traversing a travel way 1202. A travel way 1204 intersects the travel way 1202, but is not at the same level. For example, the travel way 1202 may include an overpass over the travel way 1204. The example environment 1200 shows two candidate locations 1206 and 1208. Candidate location 1206 is on the travel way 1204 and candidate location 1208 is on the travel way 1202. In this example, the vehicle autonomy system 200 may determine that the candidate location 1206 on the travel way 1204 does not comply with a goal condition for the autonomous vehicle 402 because the candidate location 1206 is on a travel way 1204 at a level different than the level of the travel way 1202 on which the autonomous vehicle 402 is traversing. The candidate location 1208, on the other hand, is positioned on the travel way 1202 and, therefore, may meet a goal condition that the candidate location be on a travel way having a common level with the travel way 1202 on which the autonomous vehicle 402 is traversing.

Figure 13:
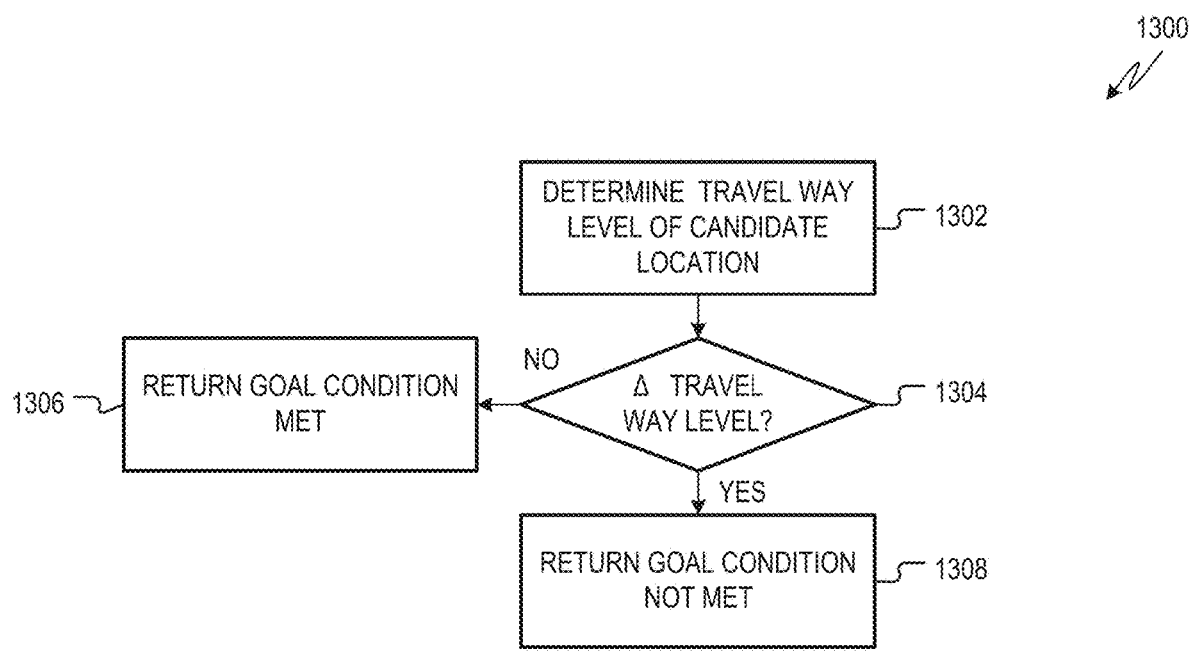
FIG. 13 is a flowchart showing one example of a process flow that may be executed to implement a goal condition that candidate locations that are on travel ways having a common vertical level with the travel way that the autonomous vehicle is traversing.

FIG. 13 is a flowchart showing one example of a process flow 1300 that may be executed by the autonomy system 200 to implement a goal condition selecting candidate locations that are on travel ways having a common vertical level with the travel way that the autonomous vehicle 402 is traversing. For example, the process flow 1300 may be executed as part of the operation 806 of the process flow 800 to determine whether a candidate location is a goal location.

At operation 1302, the autonomy system 200 may determine a travel way level of a candidate location. At operation 1304, the autonomy system 200 may compare the level of the travel way including the candidate location to the level of the travel way on which the autonomous vehicle 402 is traversing. If there is a difference between the levels of the two travel ways, the autonomy system 200 may return an indication that the goal condition is not met at operation 1308. If the two travel ways are on the same level, then the autonomy system 200 may return an indication that the goal condition is met at operation 1306.

Figure 14:
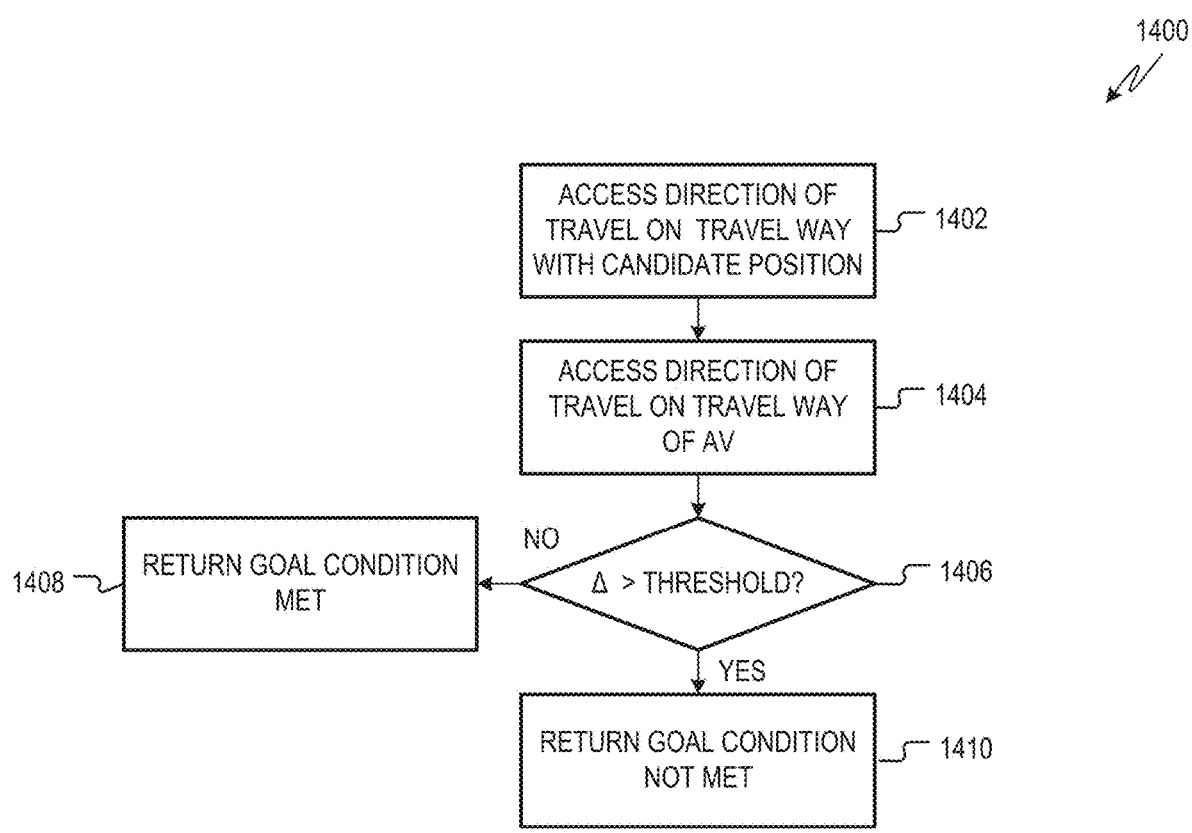
FIG. 14 is a flowchart showing one example of a process flow that may be executed to implement a goal condition selecting candidate locations that are on travel ways having less than a threshold difference in travel direction relative to the travel way being traversed by the autonomous vehicle.

FIG. 14 is a flowchart showing one example of a process flow 1400 that may be executed by the autonomy system 200 to implement a goal condition selecting candidate locations that are on travel ways having less than a threshold difference in travel direction relative to the travel way being traversed by the autonomous vehicle. For example, the process flow 1400 may be executed as part of the operation 806 of the process flow 800 to determine whether a candidate location is a goal location.

At operation 1402, the autonomy system 200 may access a direction of travel on a travel way including a candidate location. At operation 1404, the autonomy system 200 may access a direction of travel on the travel way being traversed by the autonomous vehicle 402. At operation 1406, the autonomy system 200 may determine whether a difference between the direction of travel of the travel way including the candidate location and the direction of travel on the travel way being traversed by the autonomous vehicle is greater than a threshold difference. In some examples, the difference between the two directions may be found by taking a dot product of two factors representing the two directions. The greater the value of the dot product, the greater the difference between the two directions.

If the difference between the two directions is not greater than the threshold, then the autonomy system 200 may return an indication that the goal condition is met at operation 1408. If the difference between the two directions is greater than the threshold, then the autonomy system 200 may return an indication that the goal condition is not met at operation 1410.

Figure 15:
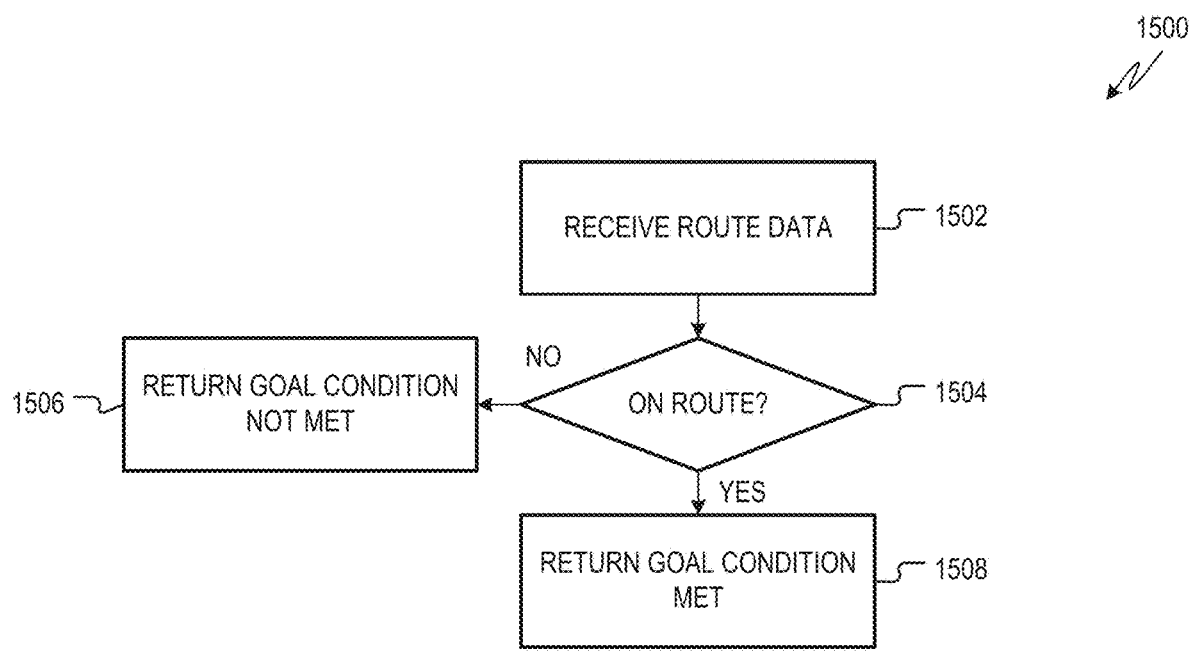
FIG. 15 is a flowchart showing one example of a process flow that may be executed by the vehicle autonomy system to implement a goal condition selecting candidate locations that are on a route determined for an autonomous vehicle.

FIG. 15 is a flowchart showing one example of a process flow 1500 that may be executed by the vehicle autonomy system 200 to implement a goal condition that candidate locations that are on a route determined for the autonomous vehicle 402. For example, the process flow 1500 may be executed as part of the operation 806 of the process flow 800 to determine whether a candidate location is a goal location.

At operation 1502, the autonomy system 200 may receive route data. The route data may describe a route that is to be executed by the autonomous vehicle 402. For example, the route data may describe a series of travel way segments between a start location and an end location for the autonomous vehicle 402. At operation 1504, the autonomy system 200 may determine whether a candidate location is on the route. A candidate location may be on the route if the candidate location is on a travel way or portion of a travel way that is part of the route described by the route data. If the candidate location is on the route, the autonomy system 200 may return an indication that the goal condition is met at operation 1508. If the candidate location is not on the route, then the autonomy system 200 may return an indication that the goal condition is not met at operation 1506.

In some examples, the autonomy system 200 may be programmed to implement a goal condition that a goal location be either on a travel way that is part of the route being traversed by the autonomous vehicle 402 or on a travel way that leads to a travel way on the route, for example, such that a vehicle at or near the candidate location may be traveling in a manner that could possibly intersect the route. A candidate location, for example, may intersect the route and/or may be connected to one or a sequence of travel ways that intersect the route. Consider an example in which the autonomous vehicle 402 is traversing a travel way that is part of a divided highway. A ramp entering the divided highway that is in front of the autonomous vehicle 402 is not part of a route being traversed by the autonomous vehicle 402. The ramp entering the divided highway, however, leads to the route because it directly or indirectly intersects the divided highway. Accordingly, a candidate location on the ramp, in some examples, may be considered a goal location for the steerable sensor 422.

In some examples, various techniques described herein for managing a field of view of the steerable sensor may also be used to select sensor data that may be of interest to the autonomous vehicle 402. For example, the autonomous vehicle 402 may include various sensors that generate high resolution data. Also, the autonomous vehicle 402 may have limiting processing resources. Accordingly, it may not be possible to analyze all of the data generated by the various sensors of an autonomous vehicle. To address this, the autonomy system 200 may implement an area of interest system. The area of interest system may generate a goal location or goal locations in a manner similar to that described herein with respect to managing a steerable sensor. The area of interest location may be provided to a sensor data processor, which may utilize the area of interest data to select a portion of sensor data for further analysis.

Figure 16:
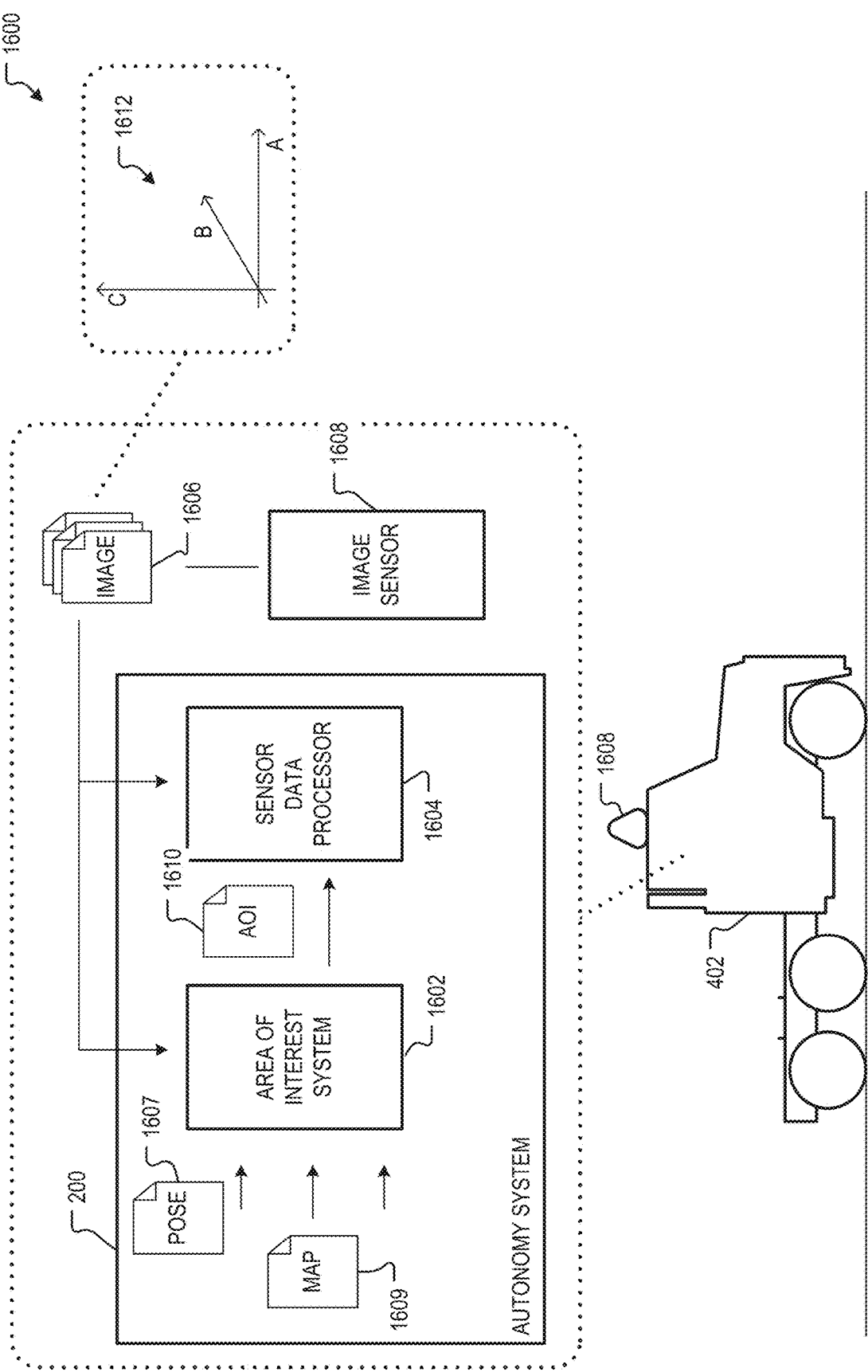
FIG. 16 is a diagram showing one example of an environment with an area of interest system for analyzing sensor data.

FIG. 16 is a diagram showing one example of an environment 1600 redo an area of interest system 1602 for analyzing sensor data 1606. In the example of FIG. 16, an image sensor 1608 generates sensor data 1606. The sensor data 1606 may be image data representing the environment 1600 in three dimensions. For example, the sensor data 1606 may comprise data describing positions in the environment 1600 described according to the dimensions indicated by coordinate frame 1612, including axes A, B, and C.

In this example, the autonomy system 200 includes an area of interest system 1602. The area of interest system 1602 may receive pose data 1607 and map data 1609. The pose data 1607, for example, as described herein, may indicate a position and/or orientation of the autonomous vehicle 402. The map data 1609 may describe the environment 1600 and may include an indication of surface data and roadway data, for example, as described herein. The area of interest system 1602 may determine a goal location by applying one or more goal conditions to candidate locations in the environment 1600. The goal location may be determined in a manner similar to that described herein, for example, with respect to FIGS. 8-15. The area of interest system 1602 may convert the goal location to area of interest data 1610 describing an area of interest in the environment 1600. The area of interest, for example, may be represented in the three-dimensional space indicated by the coordinate frame 1612.

The area of interest may be an area in the three-dimensional space around the selected goal location. In some examples, the area of interest may include all points in the three-dimensional space within a given radius of the selected goal location. In another location, the area of interest may be a box positioned with the goal location at its center. The area of interest data 1610 may be provided to a sensor data processor 1604, which may process portions of the sensor data 1606 that are within the area of interest. Results of the processing performed by the sensor data processor 1604 may be provided to various other components of the autonomy system 200 such as, for example, the localization system 230, the perception system 240, and/or the like.

Figure 17:
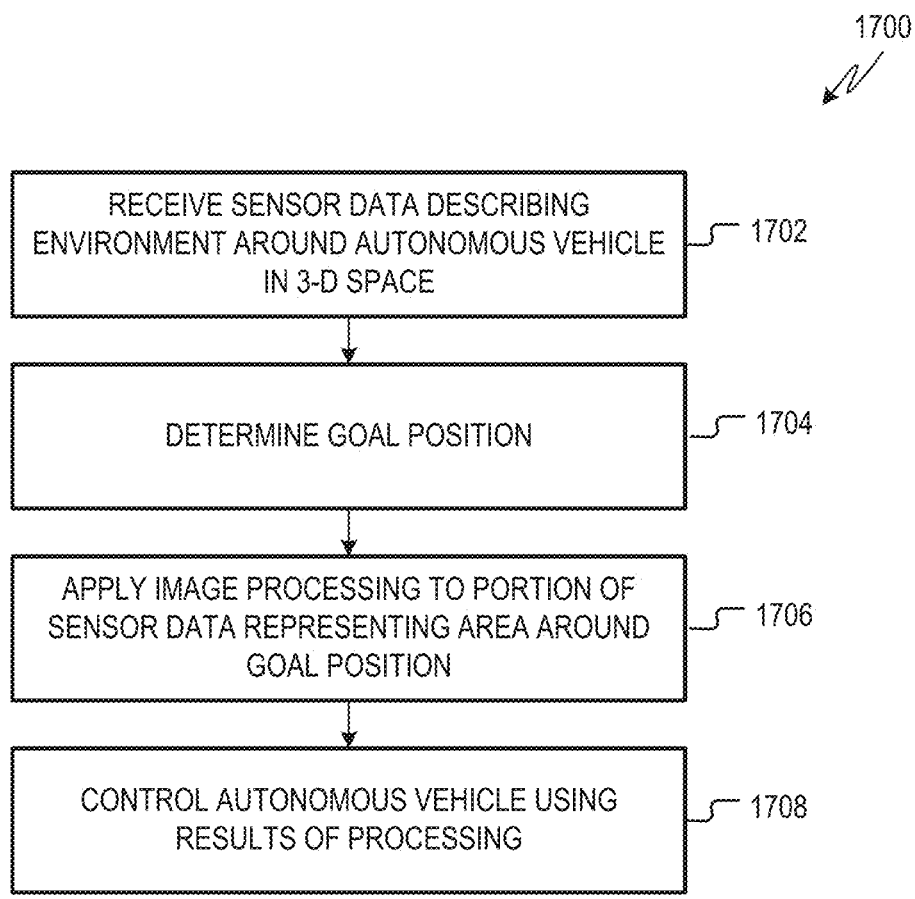
FIG. 17 is a flowchart showing one example of a process flow that may be executed by the autonomy system to process sensor data based on a goal location.

FIG. 17 is a flowchart showing one example of a process flow 1700 that may be executed by the autonomy system 200 to process sensor data, such as sensor data 1606, based on a goal location. At operation 1702, the vehicle autonomy system 200 may receive sensor data, such as sensor data 1606, describing an environment around the autonomous vehicle 402. The sensor data may represent a three-dimensional space in the environment. For example, various portions of the sensor data may correlate to corresponding points of the environment in three dimensions.

At operation 1704, the autonomy system 200 (e.g., an area of interest system 1602 thereof) may determine a goal position for the autonomous vehicle 402. The goal position may be determined, for example, as described herein including with respect to FIGS. 8-15. At operation 1706, the autonomy system 200 (e.g., a sensor data processor 1604 thereof) may process a portion of the sensor data correlating to an area in the environment 1600 that is around the sensor data. The processing applied to the selected sensor data may include object recognition as described herein, object motion analysis as described herein, and/or any other processing that, for example, is used to control the autonomous vehicle 402. At operation 1708, the autonomy system 200 may control the autonomous vehicle based on the processing of the sensor data performed at operation 1706. For example, the results of the processing may be utilized by the localization system 230 to determine a pose for the autonomous vehicle 402, by the perception system 240 to determine objects present in the environment including the autonomous vehicle 402, by the planning system 250 to determine a motion plan in view of objects present in the environment, and/or the like.

Figure 18:
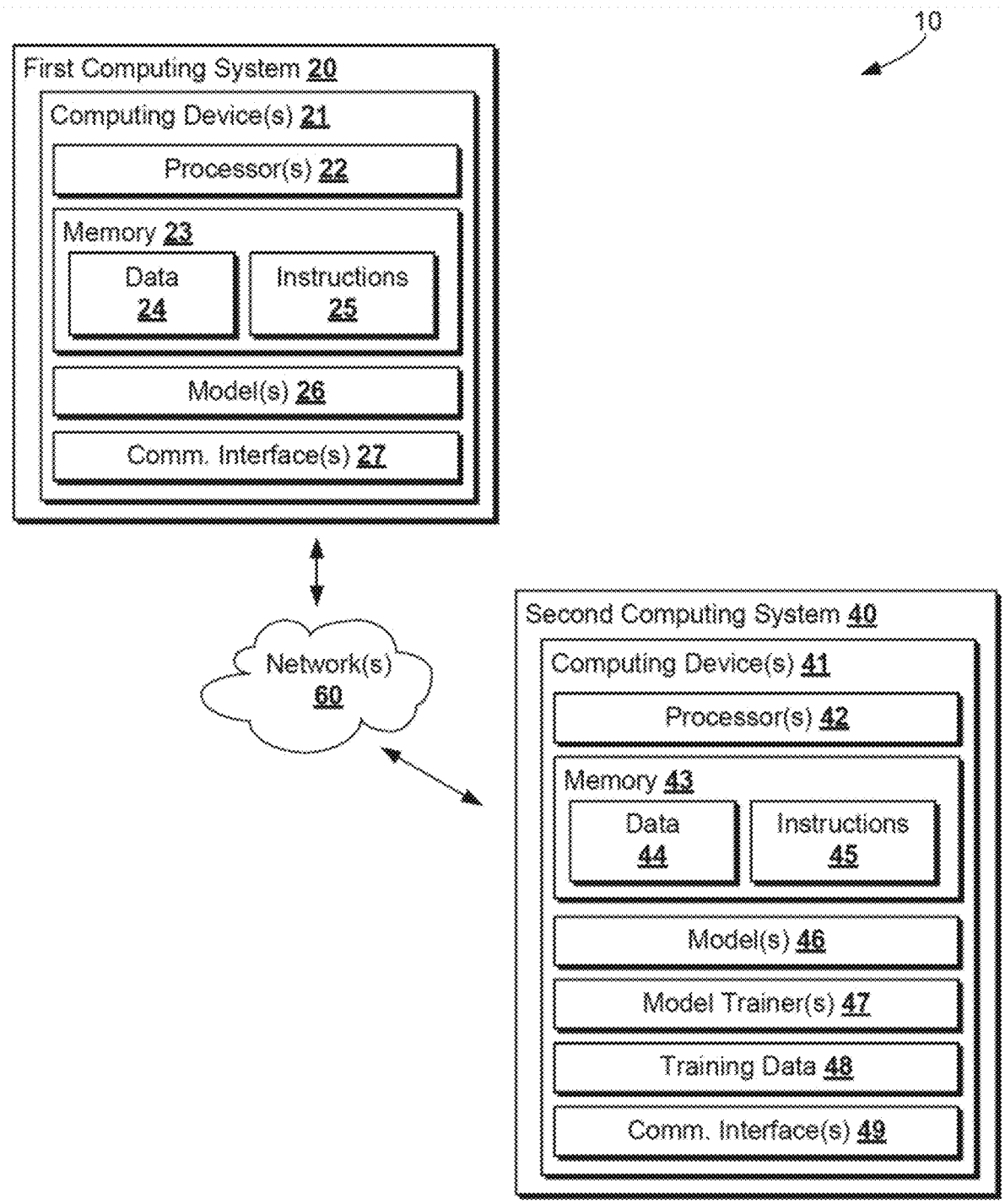
FIG. 18 is a block diagram of an example computing ecosystem according to example implementations of the present disclosure.

FIG. 18 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing system 40 can implement one or more of the systems, operations, or functionalities described herein for data annotation (e.g., the remote system(s) 160, the onboard computing system(s) 180, the autonomy system 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware.

Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include generating boundary data for annotating sensor data, such as for implementing part of a training pipeline for machine-learned machine vision systems.

In some implementations, the first computing system 20 can store or include one or more models 26. In some implementations, the models 26 can be or can otherwise include one or more machine-learned models. As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system 200 (e.g., localization, perception, planning, control, etc.) or other functionality associated with an autonomous platform (e.g., remote assistance, mapping, fleet management, trip/service assignment and matching, etc.).

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to the model(s) 26 at the first computing system 20, the second computing system 40 can include one or more models 46. As examples, the model(s) 46 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. The second computing system 40 can use the training data 48 to train model(s) 26. For example, in some implementations, the first computing system 20 can include a computing system onboard or otherwise associated with a real or simulated autonomous vehicle. In some implementations, model(s) 26 can include perception or machine vision model(s) configured for deployment onboard or in service of a real or simulated autonomous vehicle. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) 60 can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 18 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A system for directing a field-of-view of a first sensor positioned on an autonomous vehicle, the system comprising:
   at least one processor programmed to perform operations comprising:
   accessing map data describing at least one travel way in an environment of the autonomous vehicle;
   accessing pose data describing a position of the autonomous vehicle in the environment of the autonomous vehicle;
   accessing sensor position data describing a position of the first sensor;
   selecting a goal location on the at least one travel way, the selecting of the goal location comprising:
   using the map data and the pose data to determine a plurality of positions on the at least one travel way;
   determining a portion of the plurality of positions that are within a field-of-regard of the first sensor and within a range of distances from the position of the autonomous vehicle; and selecting the goal location from the portion of the plurality of positions;

determining a field-of-view position to direct the first sensor towards the goal location, the determining of the field-of-view position being based at least in part on the sensor position data;

modifying the field-of-view of the first sensor based on the field-of-view position; and controlling the autonomous vehicle based at least in part on an output of the first sensor after the modifying of the field-of-view of the first sensor.

2. The system of claim 1, wherein the selecting of the goal location comprises selecting from a plurality of positions on the at least one travel way a candidate location that meets a plurality of goal conditions, the plurality of goal conditions comprising a condition that the candidate location be within a range of distances from the position of the autonomous vehicle.

3. The system of claim 2, wherein the plurality of goal conditions further comprises a condition that the candidate location be within an azimuth range of a direction of the autonomous vehicle indicated by the pose data.

4. The system of claim 3, wherein the plurality of goal conditions further comprises a condition that the candidate location be within field-of-regard of the first sensor.

5. The system of claim 2, wherein the plurality of goal conditions further comprises a condition that a line-of-sight from the position of the first sensor to the goal location is not occluded by any map objects described by the map data.

6. The system of claim 2, wherein the plurality of goal conditions further comprises a condition that the candidate location is on a travel way at a common travel way level with a current travel way of the autonomous vehicle based at least in part on the position of the autonomous vehicle.

7. The system of claim 2, wherein the operations further comprise receiving route data describing a route of the autonomous vehicle, and wherein the plurality of goal conditions further comprises a condition that the candidate location be on the route of the autonomous vehicle.

8. The system of claim 2, wherein the operations further comprise receiving route data describing a route of the autonomous vehicle, and wherein the plurality of goal conditions further comprise a condition that the candidate location be either on the route of the autonomous vehicle or on a travel way that leads to the route of the autonomous vehicle.

9. The system of claim 2, wherein the plurality of goal conditions further comprises a condition that a difference between a direction of travel associated with the autonomous vehicle and a direction of travel at a portion of a travel way comprising the goal location be less than a threshold.

10. The system of claim 1, wherein the determining of the field-of-view position to direct the first sensor towards the goal location comprises:

using the map data and the pose data, determining a line from the position of the autonomous vehicle to the goal location;

using the sensor position data, translating the line to generate a translated line from the position of the first sensor to the goal location; and determining an angle between the translated line and a direction of the first sensor, the field-of-view position being based at least in part on the angle between the translated line and the direction of the first sensor.

11. The system of claim 1, wherein the map data, the pose data, and the sensor position data are independent of first sensor data generated by the first sensor.

12. The system of claim 1, wherein the operations further comprises:

receiving second sensor data generated by a second sensor different than the first sensor, the second sensor data describing at least a portion of the environment of the autonomous vehicle in a three-dimensional space;

determining a second goal location;

applying an image processing algorithm to a portion of the second sensor data representing an area around the second goal location in the three-dimensional space to generate processed second sensor data; and the controlling of the autonomous vehicle also being based at least in part on the processed second sensor data.

13. The system of claim 1, wherein the autonomous vehicle is a ground-based vehicle.

14. A method of directing a field-of-view of a first sensor positioned on an autonomous vehicle, the method comprising:

accessing map data describing at least one travel way in an environment of the autonomous vehicle;

accessing pose data describing a position of the autonomous vehicle in the environment of the autonomous vehicle;

accessing sensor position data describing a position of the first sensor;

selecting a goal location on the at least one travel way, the selecting of the goal location comprising:

using the map data and the pose data to determine a plurality of positions on the at least one travel way;

determining a portion of the plurality of positions that are within a field-of-regard of the first sensor and within a range of distances from the position of the autonomous vehicle; and selecting the goal location from the portion of the plurality of positions;

determining a field-of-view position to direct the first sensor towards the goal location, the determining of the field-of-view position being based at least in part on the sensor position data;

modifying the field-of-view of the first sensor based on the field-of-view position; and controlling the autonomous vehicle based at least in part on an output of the first sensor after the modifying of the field-of-view of the first sensor.

15. The method of claim 14, wherein the selecting of the goal location comprises selecting from a plurality of positions on the at least one travel way a candidate location that meets a plurality of goal conditions, the plurality of goal conditions comprising a condition that the candidate location be within a range of distances from the position of the autonomous vehicle.

16. The method of claim 15, wherein the plurality of goal conditions further comprise a condition that the candidate location be within an azimuth range of a direction of the autonomous vehicle indicated by the pose data.

17. The method of claim 16, wherein the plurality of goal conditions further comprise a condition that the candidate location be within field-of-regard of the first sensor.

18. The method of claim 15, wherein the plurality of goal conditions further comprise a condition that a line-of-sight from the position of the first sensor to the goal location is not occluded by any map objects described by the map data.

19. The method of claim 15, wherein the plurality of goal conditions further comprise a condition that the candidate location is on a travel way at a common travel way level with a current travel way of the autonomous vehicle based at least in part on the position of the autonomous vehicle.

20. The method of claim 15, further comprising receiving route data describing a route of the autonomous vehicle, wherein the plurality of goal conditions further comprise a condition that the candidate location be on the route of the autonomous vehicle.

21. A non-transitory computer-readable storage medium comprising instructions thereon that, when executed by one or more processors, cause the one or more processors to perform operations comprising:

accessing map data describing at least one travel way in an environment of an autonomous vehicle, the autonomous vehicle comprising a first sensor;

accessing pose data describing a position of the autonomous vehicle in the environment of the autonomous vehicle;

accessing sensor position data describing a position of the first sensor;

selecting a goal location on the at least one travel way, the selecting of the goal location comprising:

using on the map data and the pose data to determine a plurality of positions on the at least one travel way;

determining a portion of the plurality of positions that are within a field-of-regard of the first sensor and within a range of distances from the position of the autonomous vehicle; and selecting the goal location from the portion of the plurality of positions;

determining a field-of-view position to direct the first sensor towards the goal location, the determining of the field-of-view position being based at least in part on the sensor position data;

modifying a field-of-view of the first sensor based on the field-of-view position; and controlling the autonomous vehicle based at least in part on an output of the first sensor after the modifying of the field-of-view of the first sensor.

\* \* \* \* \*